United States Patent [19]

Mii

[11] Patent Number: 5,282,127
[45] Date of Patent: Jan. 25, 1994

[54] CENTRALIZED CONTROL SYSTEM FOR TERMINAL DEVICE

[75] Inventor: Hiroshi Mii, Gifu, Japan

[73] Assignee: Sanyo Electric Co., Ltd., Osaka, Japan

[21] Appl. No.: 615,603

[22] Filed: Nov. 19, 1990

[30] Foreign Application Priority Data

| Nov. 20, 1989 | [JP] | Japan | 1-302501 |
| Nov. 20, 1989 | [JP] | Japan | 1-302502 |
| Nov. 20, 1989 | [JP] | Japan | 1-302505 |

[51] Int. Cl.$^5$ .................. G06F 15/20; G06F 15/46
[52] U.S. Cl. ............................ 364/130; 364/138; 364/479; 340/825.16; 355/206
[58] Field of Search ............ 364/130, 131, 138, 146, 364/188, 189, 474.11, 479, 550, 551.01, 555; 340/825.23, 706, 825.06, 825.15, 825.16; 355/206, 208, 304

[56] References Cited

U.S. PATENT DOCUMENTS

| 4,251,858 | 2/1981 | Cambigue et al. | 364/132 |
| 4,354,613 | 10/1982 | Desai et al. | 221/4 |
| 4,412,292 | 10/1983 | Sedam et al. | 364/479 |
| 4,833,592 | 5/1989 | Yamanaka | 364/138 |
| 4,989,176 | 1/1991 | Khan | 364/900 |
| 5,055,996 | 10/1991 | Keslowitz | 364/188 |
| 5,077,582 | 12/1991 | Kravette et al. | 355/206 |

FOREIGN PATENT DOCUMENTS

| 56-12652 | 2/1981 | Japan . |
| 59-81656 | 5/1984 | Japan . |
| 60-263163 | 12/1985 | Japan . |

Primary Examiner—Jerry Smith
Assistant Examiner—Paul Gordon
Attorney, Agent, or Firm—Darby & Darby

[57] ABSTRACT

A centralized control system comprising interface circuits which are provided in respective terminal devices requiring field service such as copying machines or automatic vending machines and collect functional information concerning functions of the terminal devices and abnormality information showing their abnormality; communication units which are provided at every one or plural interfaces circuits and transmit collected information as the need arises; and remote control device which receives transmitted information and selectively displays it on a display unit to execute a plurality of control processing at every terminal device. Abnormality information is announced whenever it occurs or at a predetermined time according to a degree of abnormality, and information concerning the abnormality information announced is displayed on a part or full of the whole display picture screen concerning all the control processing. Further, a record of the abnormality information is stored and displayed and also information on a function along with usage quantity information of consumable goods are displayed in lists, thus notice of abnormality when it occurs and search for its cause are accurately conducted. Still further the system accurately predicts a date for replacement or supply of the consumable goods on the basis of usage quantity information, thus reducing using-up of the consumable goods.

17 Claims, 52 Drawing Sheets

Fig. 6

| 1 | 2 | 3~6 | 7 | 8 | 9~12 | 13~16 | 17~20 | 21~24 |
|---|---|---|---|---|---|---|---|---|
| STX | COMMUNI-CATION MODE | COMMUNICATION UNIT CODE (4 digits) | ⓐ | A | NUMBER OF COPIES (4 digits) | | | |
| | | | | | A3 | A4 | B4 | B5 |

| 25 | 26 | 27~30 | 31~34 | 35~38 | 39~42 | 43~46 | 47~50 | 51~54 | 55~58 | 59~62 |
|---|---|---|---|---|---|---|---|---|---|---|
| ⓐ | B | EXPOSURE VOLTAGE (4 digits) | | | BIAS VOLTAGE (4 digits) | | | HEAT ROLL TEMP. (4 digits) | | |
| | | MAX. | MIN. | AVE. | MAX. | MIN. | AVE. | MAX. | MIN. | AVE. |

| 63 | 64 | 65 | 66~69 | 70 | 71 | 72~75 | 76 |
|---|---|---|---|---|---|---|---|
| ⓐ | C | TROUBLE OCCURRENCE/ RECOVERY | TROUBLE CODE | ⓐ | D | PARTS CODE | ETX |

Fig. 7

| 1 | 2 | 3 4 5 6 | 7 | 8 |
|---|---|---|---|---|
| STX | COMMUNI-CATION MODE | COMMUNI-CATION UNIT CODE (4 digits) | @ | CENTER DEVICE TEL No. (15 digits) |

| 24 | 25 | 26 | 27~28 | 29~30 |
|---|---|---|---|---|
| @ | S | DAY OF WEEK | O'CLOCK | MINUTE |
| | | COMMUNICATION UNIT CALL TIME | | |

| 31 | 32 | 33 | 34~35 | 36~37 | 38 |
|---|---|---|---|---|---|
| @ | T | DAY OF WEEK | O'CLOCK | MINUTE | ETX |
| | | CURRENT TIME | | | |

DAY OF WEEK CODE

0 : SAME AS LAST DESIGNATION
1 : SUN.
2 : MAN.
3 : TUE.
4 : WED.
5 : THU.
6 : FRI.
7 : SAT.
8 : EVERY DAY
9 : NO TIMED TRANSMISSION

Fig. 11

| 1 | 2 | 3 4 5 6 | 7 8 9 10 | 11 | 12 | 13~16 | 17~20 | 21~24 | 25~28 |
|---|---|---|---|---|---|---|---|---|---|
| STX | COMMUNI-CATION MODE | COMMUNICATION UNIT CODE (4 digits) | TERMINAL CODE (4 digits) | ⓐ | A | NUMBER OF COPIES (4 digits) | | | |
| | | | | | | A3 | A4 | B4 | B5 |

| 29 | 30 | 31~34 | 35~38 | 39~42 | 43~46 | 47~50 | 51~54 | 55~58 | 59~62 | 63~66 |
|---|---|---|---|---|---|---|---|---|---|---|
| ⓐ | B | EXPOSURE VOLTAGE (4 digits) | | | BIAS VOLTAGE (4 digits) | | | HEAT ROLL TEMP. (4 digits) | | |
| | | MAX. | MIN. | AVE. | MAX. | MIN. | AVE. | MAX. | MIN. | AVE. |

| 67 | 68 | 69 | 70~73 | 74 | 75 | 76~79 | 80 | 83 | 84 | 85 |
|---|---|---|---|---|---|---|---|---|---|---|
| ⓐ | C | TROUBLE OCCURRENCE/ RECOVERY | TROUBLE CODE | ⓐ | D | PARTS CODE | TERMINAL CODE (4 digits) | | ⓐ | A |

| TROUBLE CODE | ⓐ | D | PARTS CODE | ETX |
|---|---|---|---|---|

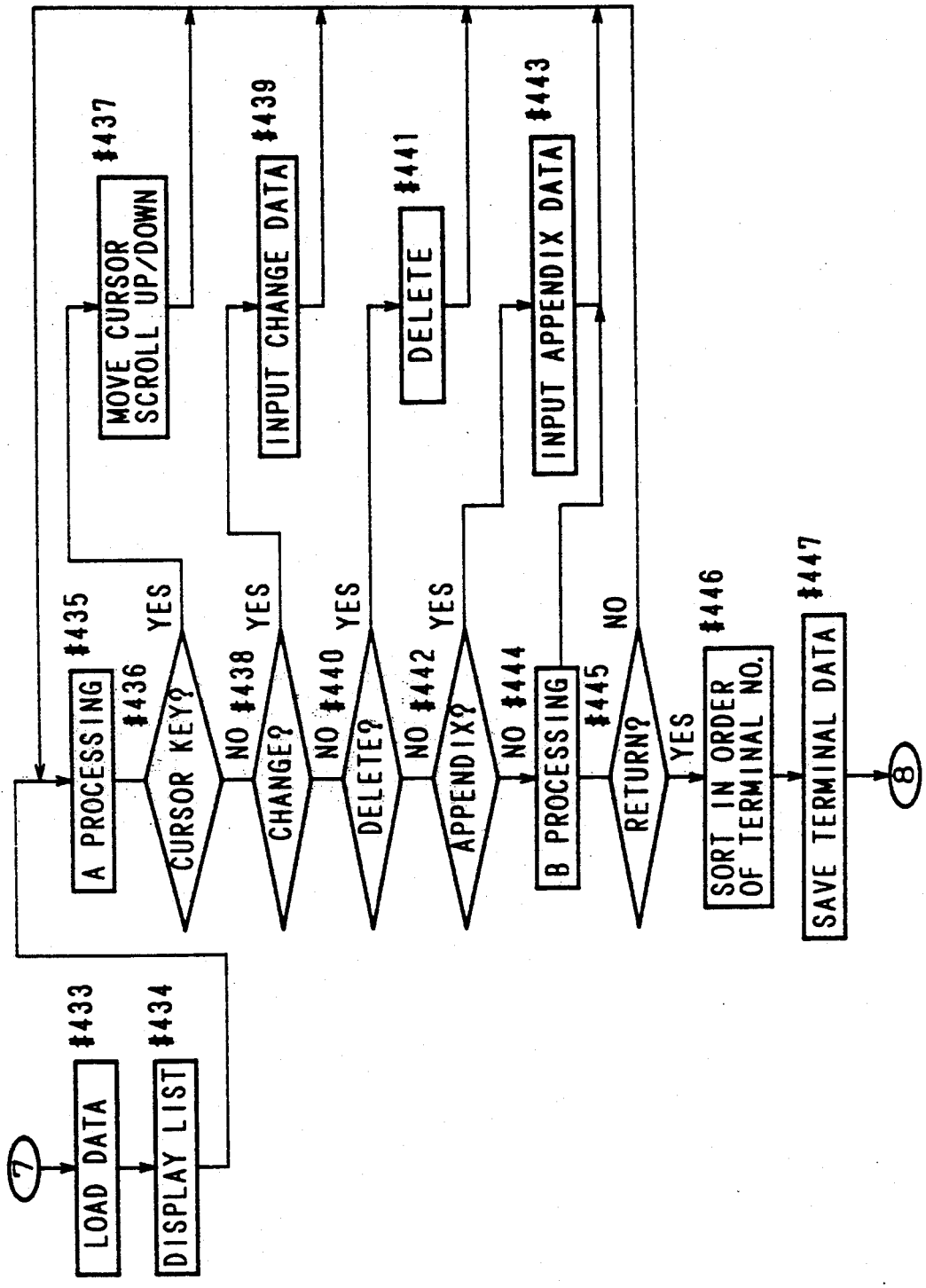

Fig. 17

—PPC SELECT—

| TERMINAL | 0001 | USER | SIGA SANYO CO. LTD. | TYPE | SFT-Z133 |
|---|---|---|---|---|---|

| TERMINAL NO. | USER NAME | TYPE | TROUBLE-REPLACEMENT INFORMATION |
|---|---|---|---|
| 0001 | SIGA SANYO CO. LTD. | SFT-Z133 | |
| 0002 | SANYO ELECTRIC CO. LTD. | SFT-Z120 | |
| ‑‑‑‑‑‑‑‑‑ | ‑‑‑‑‑‑‑‑‑ | ‑‑‑‑‑‑‑‑‑ | |

RETURN

CONDITION MONITOR

Fig. 18

—PPC SELECT—

| TERMINAL | 0001 | USER | SIGA SANYO CO.LTD. | TYPE | SFT-Z133 |

| TERMINAL NO. | USER NAME | TYPE | TROUBLE-REPLACEMENT INFORMATION |
|---|---|---|---|
| 0001 | SIGA SANYO CO.LTD | SFT-Z133 | PARTS REPLACEMENT |
| 0002 | SANYO ELECTRIC CO.LTD | SFT-Z120 ---------- | ---------- |

RETURN

CONDITION MONITOR

Fig. 19 —PPC SELECT—

| TERMINAL | 0001 | USER | SIGA SANYO CO. LTD. | TYPE | SFT-Z133 |
|---|---|---|---|---|---|

| TERMINAL NO. | USER NAME | TYPE | TROUBLE-REPLACEMENT INFORMATION |
|---|---|---|---|
| 0001 | SIGA SANYO CO. LTD | SFT-Z133 | TROUBLE OCCUR |
| 0002 | SANYO ELECTRIC CO. LTD. | SFT-Z120 | TROUBLE PARTS REPLACEMENT |
| ......... | ......... | ......... | |

CONDITION MONITOR | | RETURN | TROUBLE OCCUR

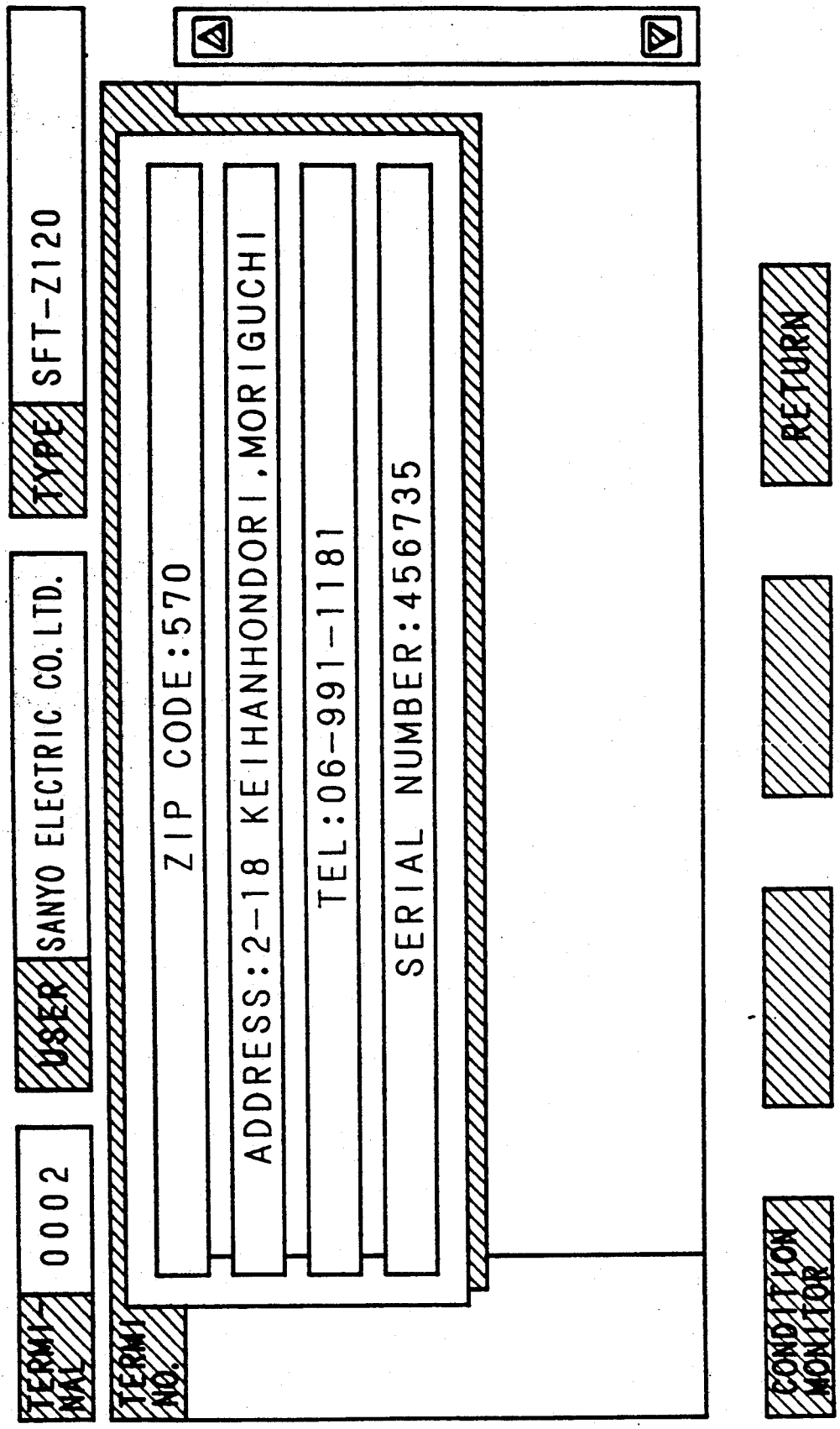

Fig. 22

—PPC CONDITION MONITOR—
(AS 19.10.1989)

| TERMINAL | 0002 | USER | SANYO ELECTRIC CO. LTD. | TYPE | SFT-Z120 |

NUMBER OF COPIES UP TO THE PRESENT TIME 000000SHEETS (ACCUMULATING TOTAL 91477SHEETS)

TROUBL CONDITION          NORMAL

[V] 182  [V] 180  [°C] 197 194 191  [%] 150 ---- 100 ---- 50 ----
85   73        200   190                    117    73           16

HEAT ROLL TEMP.   DRUM USAGE RATIO   DEVELOPER USAGE RATIO   WASTE TONER BOTTLE USAGE RATIO

PPC PERFORMANCE RECORD | PPC TROUBLE RECORD | PPC REPLACEMENT RECORD | PPC NUMBER OF COPIES

MENU    ▲NEXT    BACK▲    RETURN

Fig. 25

— PPC TROUBLE RECORD —

| TERMI-NAL | 0002 | USER | SANYO ELECTRIC CO. LTD. | TYPE | SFT-Z120 |

PRESENT CONDITION … NORMAL

| OCCURRING DATE | CONTENT OF TROUBLE | EXPOSURE VOLTAGE [V] | BIAS VOLTAGE [V] | HEAT ROLL TEMP. [°C] | RECEIVED TIME |
|---|---|---|---|---|---|
| 23.05.'89 | JAM | 72 ~ 74 | 180 ~ 181 | 190 ~ 194 | 18:45 |
| 30.06.'89 | EXPOSURE | 72 ~ 75 | 180 ~ 185 | 190 ~ 193 | 11:03 |
| 01.07.'89 | FIXING | 71 ~ 75 | 181 ~ 182 | 190 ~ 193 | 11:35 |
| 03.07.'89 | JAM | 71 ~ 74 | 181 ~ 182 | 190 ~ 194 | 15:03 |
| 15.07.'89 | JAM | 71 ~ 74 | 180 ~ 181 | 191 ~ 192 | 22:35 |

RETURN

Fig. 27

PPC NUMBER OF COPIES —— (TOTAL)

Fig. 30 — ANNOUNCEMENT OF REPLACEMENT TIME —

Fig. 31

— ANNOUNCEMENT OF REPLACEMENT TIME —

| TERMINAL | 0011 | USER | YAMATO SANYO CO. LTD. | TYPE | SFT-Z133 |

Fig. 34

—COPYING CHARGE MANAGEMENT—

| TERMINAL | 0001 | USER | SIGA SANYO CO.LTD. | TYPE | SFT-Z133 |

JUNE, 1989

| 0001 SIGA SANYO CO.LTD. | 0002 SANYO ELECTRIC CO.LTD. | 0003 SANYO TOKKI CO.LTD. | 0004 SANYO OFFICE ENGINEERING CO.LTD. | 0005 KII SANYO CO.LTD. | 0006 KITA OSAKA SANYO CO.LTD. |
|---|---|---|---|---|---|
| ¥66,784 11,696 SHEETS | ¥59,742 9,957 SHEETS | ¥64,000 11,000 SHEETS | ¥69,128 12,282 SHEETS | ¥65,548 11,387 SHEETS | ¥64,484 11,121 SHEETS |

△ ▽

CHANGE DISPLAY MONTH | SETTLEMENT | PRINT | RETURN

─── USER INFORMATION REGISTRATION ───

| | | |
|---|---|---|
| FIRST ZIP CODE 520 | USER NAME SHIGA SANYO CO.LTD.<br>ADDRESS 1-9-11 OSAKA,OHTSU-CITY | TEL 0775-22-7575 |
| SECOND ZIP CODE 546 | USER NAME SANYO TOKKI CO.LTD.<br>ADDRESS 1-32-23 KUWAZU,HIGASHISUMIYOSHI-KU,OSAKA | TEL 06-714-4162 |
| THIRD ZIP CODE 541 | USER NAME SANYO OFFICE ENGINEERING CO.LTD.<br>ADDRESS 1-1-7 KITA-KYUHOJIMACHI,CHUO-KU,OSAKA | TEL 06-266-1707 |
| FOURTH ZIP CODE 640 | USER NAME KII SANYO CO.LTD.<br>ADDRESS 1-1-19 FUKAGE,WAKAYAMA | TEL 0734-24-2451 |
| FIFTH ZIP CODE 564 | USER NAME KITAOSAKA SANYO CO.LTD.<br>ADDRESS 4-12 TOYOTSU,SUITA | TEL 06-337-8022 |
| SIXTH ZIP CODE 570 | USER NAME SANYO SYSTEM HANBAI CO.LTD.<br>ADDRESS 12 IWAIMACHI,MORIGUCHI | TEL 06-996-9273 |

CHANGE    DELETE    APPENDIX    RETURN

Fig. 37 — PPC MACHINE TYPE REGISTRATION —

| TYPE | EXPOSURE VOLT. | | BIAS VOLT. | | HEAT ROLL TEMP. | | DRUM REPLACEMENT NUMBER OF COPIES | DEVELOPER REPLACEMENT NUMBER OF COPIES | WASTE TONER BOTTLE REPLACEMENT NUMBER OF COPIES | SET DATE |
|---|---|---|---|---|---|---|---|---|---|---|
| | min max | min max | min max | min max | | | | | | |
| SFT-Z120 | ------ | 80 | 85 | 178 | 182 | 190 | 200 | 7000 | 3000 | 2000 | 19.06.'89 |
| ------ | | | | | | | | | | ------ |

[CHANGE] [DELETE] [APPENDIX] [RETURN]

Fig. 38

— TERMINAL INFORMATION REGISTRATION —

| TERMINAL NO. | TERMINAL TYPE | SERIAL NUMBER | USER NAME |
|---|---|---|---|
| 0001 | SFT-Z133 | 1 2 3 4 5 6 | SIGA SANYO CO. LTD. |
| 0002 | SFT-Z120 | 3 4 5 6 7 8 | SANYO ELECTRIC CO. LTD. |
| ---------- | ---------- | ---------- | ---------- |

CHANGE  DELETE  APPENDIX  RETURN

Fig. 42

— AUTOMATIC VENDING MACHINE TROUBLE RECORD —

| TERMINAL | USER | TYPE |
|---|---|---|
| 0002 | SANYO ELECTRIC CO. LTD. | SFT-Z120 |

PRESENT CONDITION ··· NORMAL

| OCCURRING DATE | CONTENT OF TROUBLE | RECEIVED TIME |
|---|---|---|
| 23. 05. '89 | CONSUME HOT CUP | 18:45 |
| 30. 06. '89 | DRAINAGE BUCKET FULLED WITH | 11:03 |
| 01. 07. '89 | TROUBLE OF COIN MECHANISM | 11:35 |
| 03. 07. '89 | CONSUME HOT CUP | 15:03 |
| 15. 07. '89 | CONSUME COLD CUP | 22:35 |

RETURN

CENTRALIZED CONTROL SYSTEM FOR TERMINAL DEVICE

BACKGROUND OF THE INVENTION

1. Field of the Invention

This invention relates to a centralized control system which controls terminal devices such as copying machines or automatic vending machines, requiring field service, at remote places through communication lines and, more particularly, to the same which can accurately decide the conditions of the terminal devices by means of data of abnormality information or functional information of the terminal devices:

2. Description of Related Art

An image forming device such as a copying machine requires periodic maintenance because of deterioration of its photosensitive body, dirt in the interior due to scattering and adhesion of toner, that is, the copying machine needs field service. Besides the periodic maintenance, when a copying machine causes troubles of image defects or the like due to noises such as paper jam, skin eruptions or deterioration of the photosensitive body or other abnormality, a user phones a service company to have the company dispatch a service man for maintenance of the machine. Usually a specialized service company performs the maintenance of the copying machine and also management of copying charges.

Machines such as automatic vending machines vending beverages or tobacco, air-conditioners, refrigerating showcases also require the same field service as the copying machine and makers or service companies take charge of managing these machines. Particularly, as to the automatic vending machine, some specialized vendor companies control goods and the machines, in this case a serviceman makes routine rounds for the machines and takes control of using up of goods and consumable goods and money collection. It is required for the service company to perform centralized control of the machines as the terminal devices which need the field service and to quickly respond to the abnormality.

A prior art system which carries out the centralized control of the terminal devices by a central station unit has been disclosed in Japanese Patent Application Laid-Open No. 56-12652. In this prior art, a control device, that is, the central station device receives data of a number of copies by a department transmitted from each of a plurality of copying machines and makes accumulative additions of a number of copies by a department and by a copying machine to store the data and displays or prints them as the need arises.

Further, trouble information such as paper jam and maintenance information such as lack of paper sheets, lack of developer are transmitted to the control device to display them every preset time. Particularly trouble display is carried out by providing the control device with lamps for terminal devices and blinking them to surely inform a control device's operator of trouble occurrence, together with to display the number of times of trouble occurrence.

However, in the conventional control device disclosed in said Patent Application, trouble display is effected by turning on the respective terminal lamps provided in the control device, thus many lamps corresponding to the number of the terminal devices are required to control the many terminal devices, this, therefore, causes a large size of the control device and a high cost of it. Further the number of the terminal devices is limited to the number of the lamps and as many terminal devices as a number more than the number of the lamps can not be controlled.

Further, only a number of times of troubles is displayed, thus the trouble portions or their conditions can not be recognized, therefore when a serviceman copes with the troubles, he can not analyze the contents of the troubles and also can not obtain sufficient maintenance information on whether parts should be replaced or not. In addition, there is a possibility that when a plurality of the terminal devices simultaneously transmit information on respective troubles, trouble information with high urgency can not be transmitted to the center device.

The fact that abnormality is displayed when it occurs is disclosed in Japanese Patent Application Laid-Open No. 59-81656, but practical contents of the display are not disclosed and in this case there is a possibility of causing time lag in notice of the abnormality to an operator when it is displayed on only specified screens.

A prior art system which performs centralized control of the terminal devices by a center device is disclosed in Japanese Patent Application Laid-Open No. 60-263163. This technology decides abnormality of a copying machine and to check the machine's quality by connecting a plurality of the copying machines and a data summation device with bidirectional signals. The system of this application collects user data such as a number of copies, usage quantity of toner and service data such as dirt on an optical system, a number of times of paper jam, voltage variation and the like.

However, in the above application display of data such as a number of copies, usage quantity of toner is not concretely disclosed, and in the case of only displaying these data as they are, urgency of necessity of replacement parts and supplies can not be decided and moreover in order to check the urgency it is necessary to check usage quantity at each terminal and in the case of many terminals much time is required to check them. Further, in the case of only usage quantity at the time of data reception, replacement time of parts and supply time of consumable goods can not be decided and there is a possibility of causing lack of the parts and lack of the goods at the user side.

When an abnormal tone arises in images and its cause is searched for and when only reference to individual data such as exposure volts, development bias volts are possible, much time is required to search for its cause. This is a problem.

Further, existence of abnormality can be decided by collected data but change in data in time series can not be detected, thus the abnormality can not be predicted and the serviceman can not cope with the abnormality until it has arisen and can not obtain sufficient data for searching its cause, therefore he can not accurately make a decision of the necessity of the replacement parts and supplies. This is a problem.

In the conventional centralized control system of this type, it is required to input and set on the terminal side various types of information necessary for controlling the terminals, and when the input and set of the information is large in quantity, it is troublesome.

SUMMARY OF THE INVENTION

This invention has been attained in view of these situations and therefore the first object of the invention is to provide a centralized control system which can immediately display abnormality of a terminal device trouble on a display picture screen even when other processing is proceeding and thereby immediately provides notice of the abnormality when it occurs, and this is performed with low cost and flexibility without being limited by a number of the terminal devices.

The second object of the invention is to provide a centralized control system which can store a record of abnormality information transmitted from a terminal device and display them as the need arises, and thereby can see the record of abnormality information when abnormality occurs again and analyze contents of troubles and can obtain maintenance information on necessity of replacement parts and supplies.

The third object of the invention is to provide a centralized control system which displays lists of a plurality of data concerning a function of each terminal device, thereby instantly notices correlation between mutual data and obtains accurate maintenance information when the cause of abnormality is searched for.

The fourth object of the invention is to provide a centralized control system which displays a record of data concerning a function of each terminal device, thereby can detect a change in data, predict abnormality, prevent it from occurring together with displaying a record of data concerning abnormality when it occurs again, and examining the change in data, thus can search the cause of the abnormality and decide necessity of replacement parts or supplies.

The fifth object of the invention is to provide a centralized control system which displays on a display screen information on usage quantity of consumable goods in each terminal unit in conjunction with the usage quantity, thereby can give notice information on usage in order of urgency.

The sixth object of the invention is to provide a centralized control system which predicts usage quantity in a predetermined future term, thereby can quickly predict demand of consumable goods and prevent lack of the consumable goods such as parts, goods on the user side.

The above and further objects and features of the invention will more fully be apparent from the following detailed description with accompanying drawings.

BRIEF DESCRIPTION OF THE DRAWINGS

FIG. 6 is a diagram showing an example of an electronic data message to be transmitted from the communication unit to the center device.

FIG. 7 is a diagram showing an example of an electronic instruction data message to be transmitted from the center device to the communication unit.

FIG. 11 is a diagram showing an example of an electronic data message to be transmitted from a communication unit to a center device of the modified configuration.

FIGS. 14(a) to 14(i) are flowcharts showing contents of processing of a data display unit.

FIGS. 15 to 38 are diagrams showing display screens, and

FIGS. 39 to 42 are diagrams showing display screens of the remote control unit of other embodiment.

DESCRIPTION OF THE PREFERRED EMBODIMENTS

Figure 1:
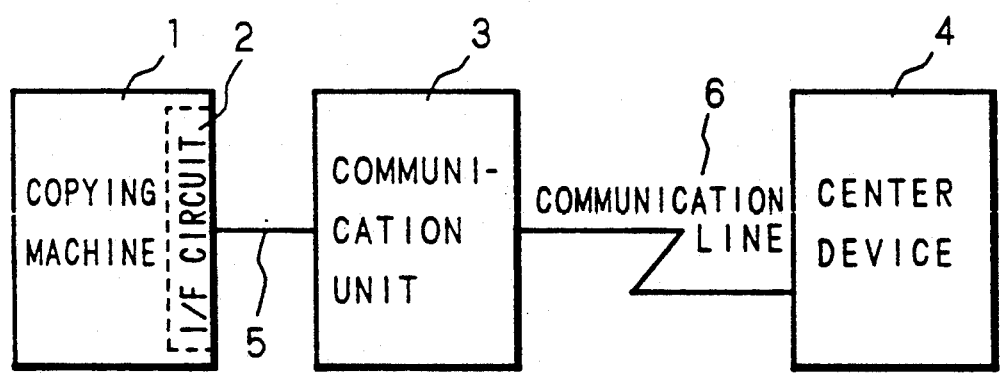
FIG. 1 is a schematic block diagram showing a configuration of a centralized control system of the invention.

This invention will be explained in detail referring to the drawings of the embodiments.

In FIG. 1, numeral 1 denotes a copying machine as a terminal device. Besides the copying machine the terminal devices may include all devices such as image forming devices like a laser printer, automatic vending machines, air-conditioner and refrigerating show cases that need field service. An interface (hereinafter called I/F) circuit 2 being an information collecting means is provided in the copying machine 1.

The I/F circuit 2 interfaces between the copying machine 1 and a communication unit 3 being a terminal communication means and is connected with the communication unit 3 through a transmission line 5. As to a format and a control mode of data flowing on the transmission line 5, many modes such as a serial mode, parallel mode and a competitive control mode can be used. The communication unit 3 performs identification and control of the copying machine 1, data input/output from/to the copying machine 1, temporary storage of data coming from the copying machine 1, control of a state of the copying machine 1, preparation of data to be transmitted to the center device 4 being a remote control means which is described later, data input/output from/to the center devices 4 and control of call timing.

The center device 4 is connected with the communication unit 3 through a communication line 6 for a private line including a public telephone line, leased line or LAN (Local Area Network) and receives data transmitted from the copying machine 1 through the communication unit 3 and executes application software which controls the copying machine 1 and performs data input/output from/to the communication unit 3.

In this embodiment the communication unit 3 is provided in the exterior of the copying machine 1 but it may be installed in the interior of the copying machine 1. The communication unit 3 can only call from itself to reduce cost but it may be made so as to receive call from the center devices 4.

Figure 2:
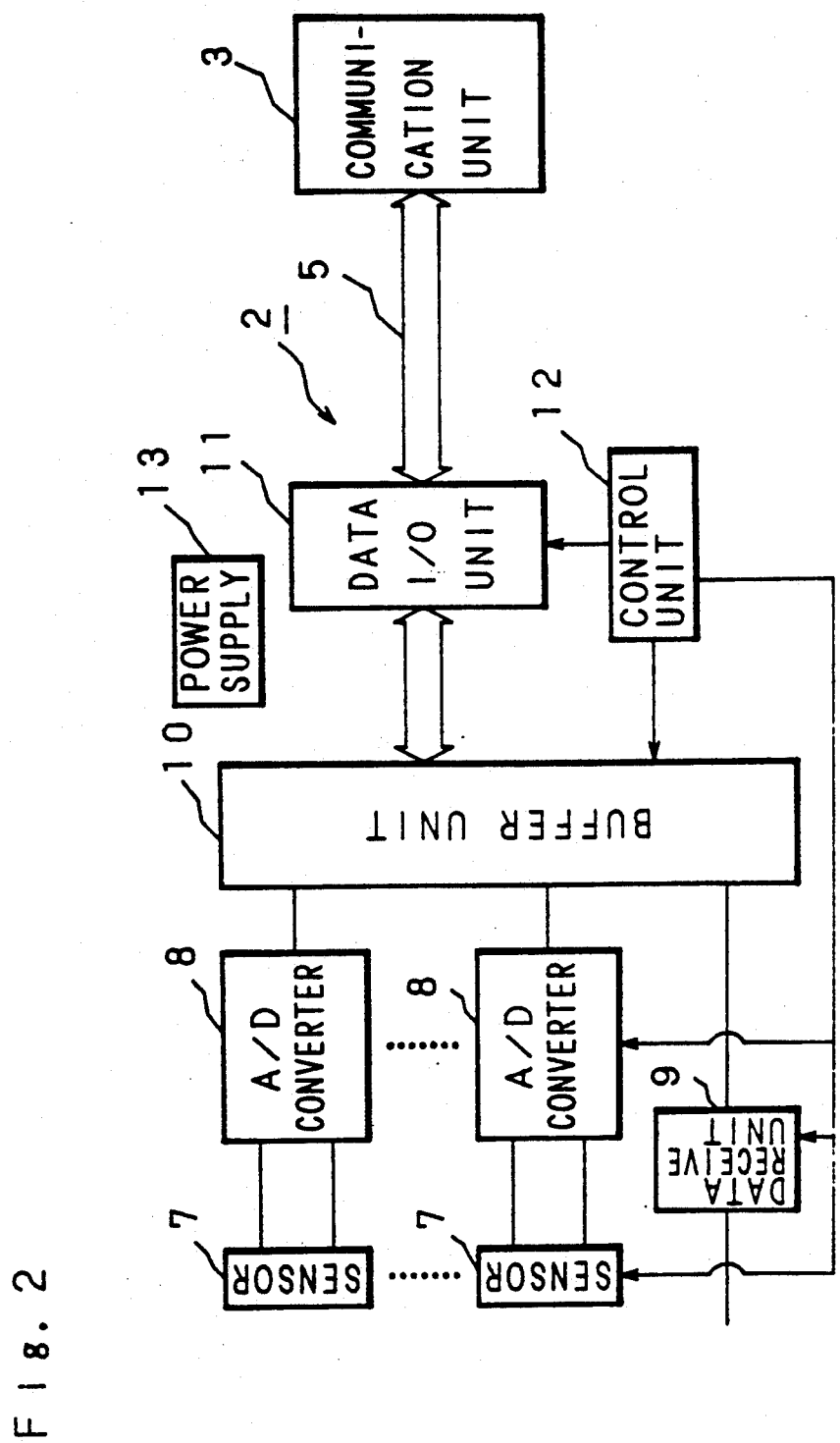
FIG. 2 is a block diagram showing an I/F circuit configuration.

FIG. 2 is a block diagram showing an I/F circuit configuration. In the figure numerals 7, 7 . . . are sensors for obtaining data such as voltage, current, temperature, state and a number of copies of the copying machine 1, and these sensors pick up data concerning a function of the copying machine 1 such as a temperature of a fixing unit heat roller, development bias voltage of a development unit, exposure voltage, a number of times of toner supply, and usage quantity of waste toner bottles, and when data obtained from the sensors 7, 7 . . . are analog values, they are supplied to A/D converters 8, 8 . . . to convert them into digital values. When the copying machine 1 itself stores data of a number of copies, the data indicative of the number of copies is supplied to a data receive unit 9, not to the A/D converters 8, 8 . . . . Further the A/D converters 8, 8 . . . may be replaced by level converters that converts levels. The data obtained from the A/D converters 8, 8 . . . or the data receive unit 9 is temporarily stored in a buffer unit 10 and transmitted to a communication unit 3 through a data input/output unit 11 in response to transmission request of the copying machine 1 or request of the communication unit 3. The sensors 7, 7 . . . , A/D converters 8, 8 . . . , data receive unit 9, buffer unit 10, and the data input/output unit 11 are controlled by a control unit 12 and timing for each data is controlled. Necessary power is supplied to the I/F circuit 2 by a power supply 13. In addition the power supply 13 may be shared with the copying machine 1.

Figure 3:
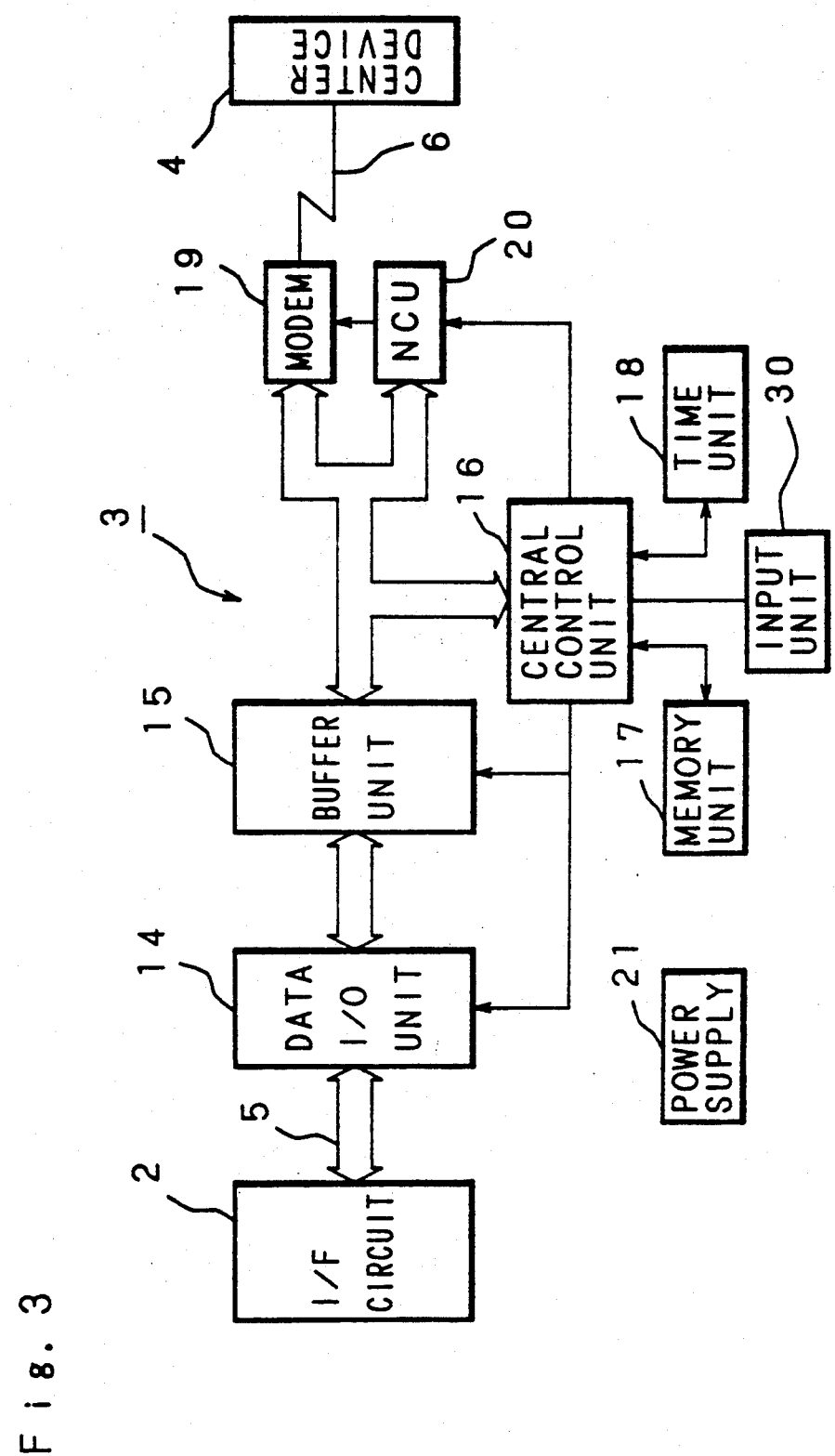
FIG. 3 is a block diagram showing a communication unit configuration.

FIG. 3 is a block diagram showing the configuration of the communication unit 3. Data transmitted to the communication unit 3 through the transmission line 5 is temporarily stored in a buffer unit 15 through a data input/output unit 14. The data stored in the buffer unit 15 is supplied to a central control unit 16 comprised of, for example, a microprocessor, in which primary processing described later is performed.

A line number of a data destination which is preset (e.g. center device 4) is transmitted from the central control unit 16 to NCU (Network Control Unit) 20 to make connection with the communication line 6 having that line number, and the data input/output is effected between the central control unit 16 and the center device 4 through a modem 19 and the communication line 6. The central control unit 16 is connected to a memory unit 17 which stores a program for controlling the communication unit 3, time data for predetermined time reports and data for line numbers to be transmitted to the NCU 20, and to an input unit 30 which informs the central control unit 16 of parts replacement and communication test when necessary and further to a time unit 18. The communication unit 3 is provided with a power supply 21.

The central control unit 16 operates on the basis of a given program or instructions from the center device 4 and usually performs data input/output from/to the copying machine 1, analysis and processing of that data and monitoring of the copying machine 1. When abnormal data is transmitted from the copying machine 1 to the central control unit 16 and when the time stored in the memory unit 17 coincides with the time of the time unit 18 coincide, the central control unit 16 transmits the preset data destination number to the NCU 20 to make connection of the communication line 6 and performs data input/output from/to the center devices 4 through the modem 19 and communication line 6.

Figure 4:
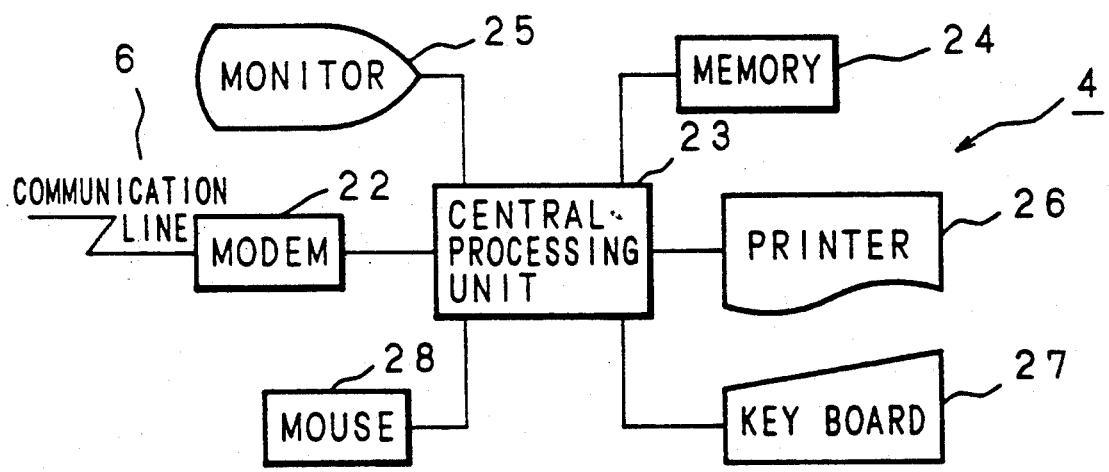
FIG. 4 is a block diagram showing a configuration of a center device that is a remote control unit of the invention.

FIG. 4 is a block diagram showing a configuration of the center device that is a remote control unit of the invention, and the center device 4 is comprised of, for example, a personal computer or an office computer and is configured of a modem 22 which performs data input/output between a central processing unit 23 and the communication line 6, a memory 24 which includes a ROM and RAM storing data and programs and an auxiliary memory, a monitor 25 which displays images and data, a printer 26 which prints necessary items, a key board 27 which inputs data and a mouse 28 which specifies positions on the monitor 25. Data given to the central processing unit 23, as described later (refer to FIG. 8), is sequentially transmitted to a transmitter-receive unit 231, receive text buffer unit 232, receive text processing unit 233 and a file store unit 234, and is processed. Data stored in the file store unit 234 is transmitted to a data display unit 236 to be processed and displayed on the monitor 25 in response to instructions of data registration and display request.

Now, functions of the I/F circuit 2, communication unit 3 and the central device 4 will be described in detail.

The I/F circuit 2 supplies data necessary for controlling the copying machine 1 to the center device 4 through the communication unit 3. Data collected by the I/F circuit 2 includes, for example in the case of the copying machine 1, a number of copying sheets of each size, voltages of main portions such as exposure voltage, development bias voltage, temperatures of the main portions such as a temperature of a heat roller, trouble information such as paper jam at each position, using-up of toner (developer), using-up of paper and abnormal voltages, and information on the power supply on/off, states of the copying machine. Of these data the number of copies of each paper size and voltages and temperatures of the main portions are measured every time the copying machine 1 operates and temporarily stored in the buffer unit 10 and transferred to the communication unit 3 through the data input/output unit 11 response to request of the communication unit 3, and the trouble information and copying machine information can be always monitored by the communication unit 3. When an amount of data to be transmitted from the transmission line 5 is large, the data may be transmitted time sharingly to prevent from increasing in number of the transmission line 5.

Table 1 shows one example of a signal composition on the transmission line 5 between the I/F circuit 2 and the communication unit 3. Between the I/F circuit 2 and the communication unit 3 is connected with 8 bits data signals, 4 bits select signals and 4 bits status signals.

TABLE 1

| signal name | | direction | | contents |
|---|---|---|---|---|
| | | copying machine | communication unit | |
| Data signal | Data 0 | → | | number of copies in corresponding to select 0-3 |
| | Data 1 | | | |
| | Data 6 | | | |
| | Data 7 | | | Outputs measured data trouble information |
| select signal | Select 0 | ← | | Selects output data |
| | Select 1 | | | |
| | Select 2 | | | |
| | Select 3 | | | |
| status signal | Trouble | → | | Indicates trouble occurrence |
| | Copy RDY | → | | Indicates copy allowed |
| | Power | → | | Indicates power supply ON |
| | GND | ⇌ | | |

Table 2 shows one example of relations between states of the select signals and data. Data such as a number of copies of each paper size, exposure voltages, development bias voltages, heat roller temperatures and trouble modes are outputted in 8 bits data signals Data 0-Data 7 in response to set, reset (=1, 0) of each bit S0-S3 of the select signal.

TABLE 2

| S3 | S2 | S1 | S0 | contents | |
|---|---|---|---|---|---|
| 0 | 0 | 0 | 0 | number of A3 copies | high order two digit |
| 0 | 0 | 0 | 1 | number of A3 copies | low order two digit |
| 0 | 0 | 1 | 0 | number of A4 copies | high order two digit |
| 0 | 0 | 1 | 1 | number of A4 copies | low order two digit |
| 0 | 1 | 0 | 0 | number of B4 copies | high order two digit |
| 0 | 1 | 0 | 1 | number of B4 copies | low order two digit |
| 0 | 1 | 1 | 0 | number of B5 copies | high order two digit |
| 0 | 1 | 1 | 1 | number of B5 copies | low order two digit |
| 1 | 0 | 0 | 0 | exposure voltage | high order two digit |
| 1 | 0 | 0 | 1 | exposure voltage | low order two digit |
| 1 | 0 | 1 | 0 | development bias voltage | high order two digit |
| 1 | 0 | 1 | 1 | development bias voltage | low order two digit |
| 1 | 1 | 0 | 0 | heat roller temperature | high order two digit |
| 1 | 1 | 0 | 1 | heat roller temperature | low order two digit |
| 1 | 1 | 1 | 0 | trouble mode | |
| 1 | 1 | 1 | 1 | reserved | |

Figure 5:
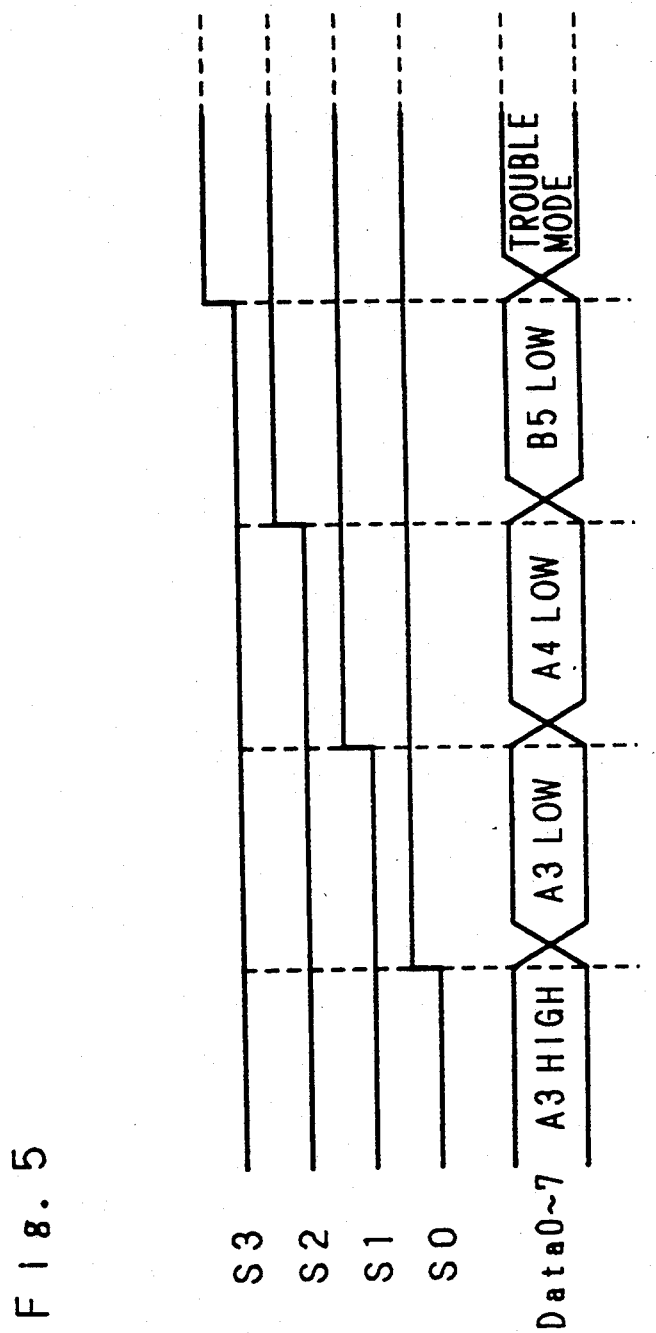
FIG. 5 is a timing chart showing a relation between select signal states and data output timing.

FIG. 5 is one example of relations between select signal states and data output timing. A control unit 12 of the I/F circuit 2 collects data of the copying machine 1, together with monitoring the states of the select signals S0–S3 from the communication unit 3 and always outputting data corresponding to a state of the select signals S0–S3 as a data signal Data 0–7. When a trouble occurs in the copying machine 1, the control unit 12 immediately turns on a trouble signal and simultaneously sets a trouble mode number (trouble code), showing a content of the trouble, in a trouble register (not shown) of the buffer unit 10 to provide for a request for the trouble mode number (select signals S3, S2, S1, S0=1110) from the communication unit 3. The control unit 12 turns off a Copy RDY signal during copy operation and informs the communication unit 3 that data detected by the sensors 7,7 ... during this time are not ensured.

The communication unit 3 always monitors the copying machine 1 and performs primary processing of the data transmitted from the copying machine 1. The primary processing includes control of a number of copies of each paper size, control of the maximum and/or minimum values of voltages and temperatures of the main portions and calculation of mean values. Further, continuous monitoring items include turning on and/or off of the power supply, watching on copying and watching on states of troubles and so on.

The communication unit 3 usually, with the power supply being turned on, switches the select signal at the timing of a ready state (Copy RDY signal on) of the copying machine 1 to read measured data such as a number of copies of each paper size and voltages and temperatures of the main portions.

When the trouble signal is set, the communication unit 3 switches the select signal to read the trouble mode number (trouble code) and to decide a content of the trouble. The contents of the troubles are classified into, for example, predetermined levels (first class trouble, second class trouble and third class trouble or the like). In the case of the first class trouble, the communication unit 3 immediately calls the center device 4 to announce occurrence of the serious trouble of the copying machine 1. In the case of the second class trouble, when occurrences of the trouble reach a predetermined number of times, the communication unit 3 informs the center device 4 of the fact. In the case of the third class trouble, the data is sent at a fixed time communication. Further, when sending the first, second, or third class troubles or the fixed time communication, the sending may be controlled in such a manner that the timing of the sending is limited and controlled according to the order of priority. For example, when the first class trouble occurs, the sending is carried out without limitation, the second class trouble can be sent at the timing of a multiple of two minutes and the third class trouble can be sent at the timing of a multiple of three minutes and the fixed time sending or other sending can be carried out at the timing of a multiple of five minutes. When the communications more than two coincide with one another, some terminals can not communicate with the center device. In this case, calls can be controlled in the similar manner that the first class trouble is sent at the timing of a multiple of one minute, the second class trouble at the timing of a multiple of two minutes, the third class trouble at the timing of a multiple of three minutes, and the fixed time sending at the timing of a multiple of five minutes, as a result the first class trouble with high order of priority is first sent to the center device.

When the Power signal is turned off, a number of copying sheets of each size read up to that time is temporarily stored in the memory 17, and in the case of the copying machine having no memory back up, the saved data and the following data are added to produce new read data.

The communication unit 3 has a function of transmitting a number of copies of each paper size and measured data to the center device 4 and sets the following five types of call timings to the center device 4.

(1) Power ON call: when the Power supply of the communication unit 3 is turned ON
(2) Fixed time call: fixed time (usually one time 1 day)
(3) Trouble occurrence call: when a trouble to be sent occurs and when it recovers.
(4) Parts replacement call: when a serviceman replaces parts and instructs a call.
(5) Communication test call: when pushing the communication test switch.

The call destination is usually only the predetermined center device 4, but considering the off time of a holiday and midnight, total three of the call destinations can be set in this embodiment. Further, the call destination and the timing of the fixed time call can be changed in response to instructions of the center device 4.

Considering trouble occurrence during data transmission to the center device 4, the call destination is given an order of priority for reception, and the communication unit 3 transmits data in high order of priority. The call timing will be next explained in detail.

The Power ON call is a call for matching of sequence with the center device 4 when the power supply of the communication unit 3 is turned on. After sending the current state of the copying machine 1. The communication unit 3, after transmitting the present state of the copying machine 1, receives a center device number, a timing of the fixed time call and the current time from the center device 4 and writes them into its own memory 17.

The fixed time call is a call for transmitting the copying machine 1 data collected by the communication unit 3 at a predetermined timing or specified timing instructed by the center device 4. After finishing the fixed time call, the communication unit 3 clears the number of copies of each paper size and the measured data and, when having return data, sets its content in the memory 17.

The trouble call has two calls, one of which is for transmitting a trouble to the center device 4 immediately when the copying machine 1 causes the first class trouble or the second class trouble with the number of times of occurrence to be sent, and the other is for reporting their recovery. In this case the trouble code indicative of a trouble content is transmitted and further the trouble recovery together with the trouble code are transmitted at the time of its recovery.

The parts replacement call is a call for transmitting to the center device 4 replacement of the copying machine 1 parts (for example photosensitive drums, developer, waste toner bottles) which requires a serviceman's record.

The communication test call is a call for transmitting test results required in the case of system maintenance and check.

The communication test call is performed when the communication unit 3 is installed and the communication unit 3 receives a center device number, a timing of the fixed time call and the current time from the center device 4 and writes them into the memory unit.

By using the system in which part of the information required for the communication unit 3 to execute processing is received from the center device 4, a time necessary for information setting in the communication unit 3 is alleviated. In addition, the timing of the fixed time call is received from the center device 4, thus the timing of the fixed time call can be easily changed. The current time can be maintained in matching with the time of the center device 4 as the standard.

Independent of communication with the I/F circuit 2, the parts replacement call and the communication test call start by operating an input unit 30 of the communication unit 3 by a serviceman or operator.

In the communication unit 3, when a call condition is ready, a call destination number with the highest order of priority is transferred to NCU 20 to request circuit connection. When the circuit is connected, data is transmitted to the center device 4 through a modem 19. After finishing, this data is successively transmitted similarly to each call destination in order of priority.

Concerning a communication procedure between the communication unit 3 and the center device 4 there are many systems, but the present system employs the contention system with no procedure which is based on JIS C 6326. When a communication circuit is busy or there arises an error or a circuit disconnection during communication, data is repeatedly transmitted up to three times.

FIG. 6 is a diagram showing one example of an electronic data message transmitted from the communication unit 3 to the center device 4. The electronic message is sent in byte unit and numerals in the figure show byte numbers. The first byte STX shows the head of data. The second byte communication mode shows the content of said call, and numerals 1-5 are assigned from the Power ON call to the communication test call.

@A-@D of 7-8, 25-26, 63-64, 70-71 bytes mean data of each block and @A shows a number of copying sheets, @B measured data, @C trouble information, and @D parts replacement information. Each four bytes data following @A, @B shows a number of copies of each paper size added up until that time and the maximum value, minimum value and the mean value of each measured data. One byte numeral following @C shows trouble occurrence/recovery, that is, occurrence: 1, recovery: 0. Four bytes following this byte shows trouble codes of the troubles caused/recovered. The contents of troubles include abnormal exposure voltages, abnormal development bias voltages, abnormal heat roller temperatures, paper choke-up, scanning device malfunction. Four bytes following @D represents the replaced parts code with four digits. Further @C and trouble code or @D and the parts replacement code are transmitted when the communication mode is the trouble occurrence call or the parts replacement call and are not transmitted when the mode is the other. ETX represents the end of data.

When instructions are issued from the center device 4, after detecting ETX from the communication unit 3, the center device 4 transmits the instruction data to the communication unit 3. FIG. 7 is a diagram showing one example of an electronic instruction data message transmitted from the center device 4 to the communication unit 3, where, as to the communication mode of the second byte, the code transmitted by the communication unit 3 is again transmitted. A fifteen digits numeral following @R shows the center device 4 number, and this is transmitted even if it is not changed. Data following @S is data for specifying a timing of the fixed time call of the communication unit 3 during its communication. A day-of week code is so specified that in the case of the same as last designation, it is 0, for every day, 8 and in the case of unnecessity of time transmission, it is 9. When it is requested to perform the time transmission once a week, day of week is specified with numerals 1-7. O'clock and minute are specified with two digits in 24 hours notation. Data following @T is data showing current time. Sometimes the current time differs between the communication unit 3 and the center device 4, thus when the communication mode is Power On call, the center device 4 surely returns the data to take coincidence of timings. Further, by adding @U and @V as the returning data and transmitting this data and a terminal control code, it is possible to perform remote maintenance of the copying machine 1 and to transmit trouble diagnosis information to a serviceman.

Now, the center device 4 will be explained in detail.

Figure 8:
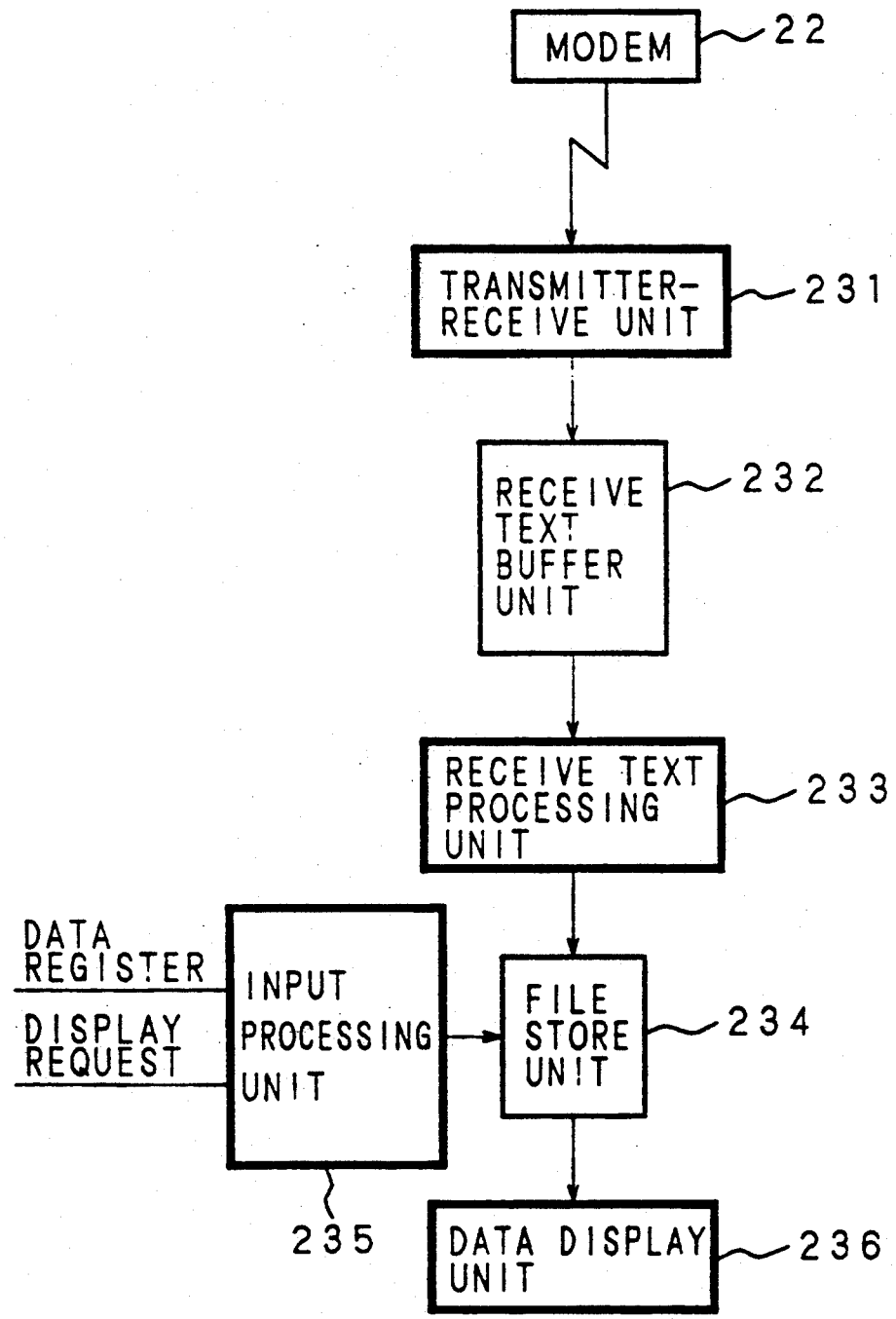
FIG. 8 is a block diagram showing a configuration of the central processing unit of the center device.

The center device 4 is provided in a field service company and has various types of functions for data which is transmitted from each communication unit 3 to the center device 4 through the communication line 6 in response to the call of the communication unit 3, that is, control of the communication line, control of transmission, storage into memory or update, various types of display processing and display on the basis of stored data, information registration concerning users which install the communication unit 3 and the copying machine 1, registration and input/output control of used machine type data and used parts. FIG. 8 is a block diagram showing a configuration of the central processing unit of the center device 4. A transmitter-receive unit 231 detects communication from the communication unit 3 in response to interruption from a modem 22 and performs communication line control and transmission control to store received texts like measured data from the modem 22 into a receive test buffer unit 232. A receive text processing unit 233 verifies the contents of the receive text buffer unit 232 in a main processing and analyzed the contents of the received text if any and stores the data into a file store unit 234. Display control means, that is, a data display unit 236 reads the contents of the received text stored in the file store unit 234 in response to request for data registration or display and processes the data to meet its usage and displays the data on the monitor 25.

The transmitter-receive unit 231 monitors the state of the modem 22, and checks a received data error, transmits ACK or NAK in response to the result of the checking, performs sequence control, transmits down load data and sets the received text in the receive text buffer unit 232.

A function of the receive text processing unit 233 is divided into two parts, that is, received data preprocessing and received data update processing. The received data preprocessing verifies occurrence of the received text and then checks its format and transfers the data to a next stage if no error. The received data update processing takes out data necessary for update from the preceding stage and converts date update data, number of copies data, trouble data, measured data, and parts replacement data into data having formats corresponding to file record and write th into the file.

The received text processing unit 233 also has a buffer storing four lists of a replacement requiring list, a trouble list, a usage ratio list, and an estimation list, and the replacement requiring list stores terminal codes (numbers) of parts requiring replacement, and the trouble list stores terminal codes (numbers) of troubled terminals respectively. The usage ratio list and the estimation list are made by calculating the usage ratio from the received data and stores the parts codes sorted in order of the part having a high usage ratio.

Figure 9:
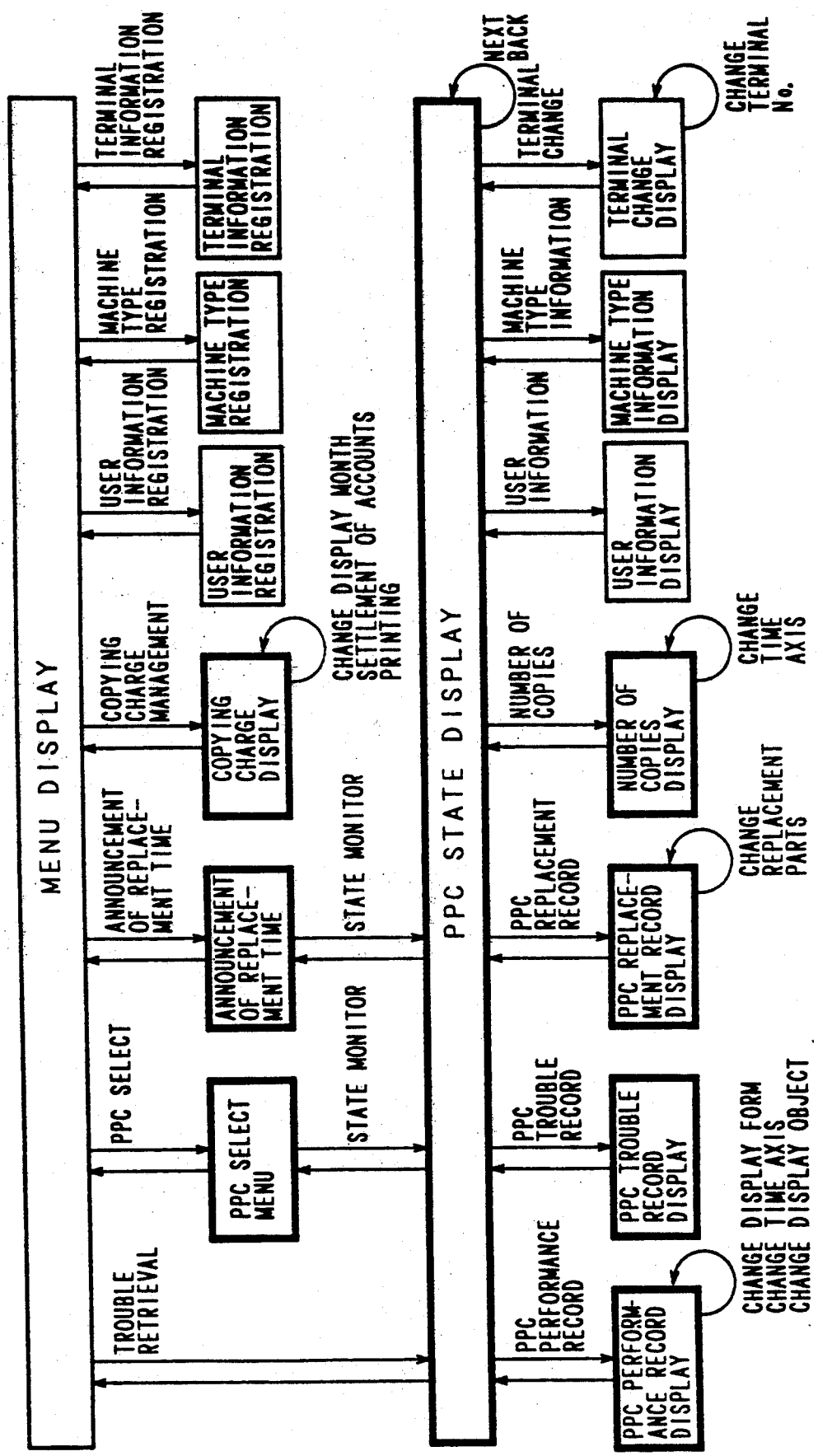
FIG. 9 is a diagram showing a list of display contents.

A data display unit 236 processes data to display the following twelve types display screens on the monitor 25 according to an instruction of the operator's key board 27 input and the mouse 28 operation. FIG. 9 is a diagram showing a list of display contents of the data display unit 236. Even in the course of displaying a screen, when receiving trouble occurrence, the trouble information is displayed on the screen. Further, when a menu screen is being displayed, parts replacement announcement is also issued.

a. menu display: select contents of processing
b. PPC selection: select a terminal for PPC state display
c. replacement time announcement: display parts usage ratios
d. copying charge display: calculate the copying charges and display them
e. PPC state display: display updated PPC states
f. PPC performance record display: display measured data records
g. PPC trouble record display: display the trouble records
h. PPC replacement record display: display parts replacement records
i. PPC number of copies display: display a number of copies of each paper size per day
j. user registration: registration, change and deletion of user information
k. machine type registration: registration, change and deletion of machine type information
l. terminal registration: registration, change and deletion of terminal information.

Among these display screens, the display screens b-i shown with double frames can also display user information, machine type each information and terminal information. The mouse 28 can be used for instruction of the a-i data display, thus offering convenience to an operator. That is, the operator can instruct display by moving the cursor to a portion displaying each information by using the mouse 28 and clicking. Cancellation of display is also effected by the mouse 28. However data must be carefully inputted for the j-k operation, thus the keyboard 27 is used for this purpose.

Now, contents of the display will be explained in detail.

FIGS. 15-38 are diagrams showing monitor 25 screen configurations processed by the data display unit.

Figure 15:
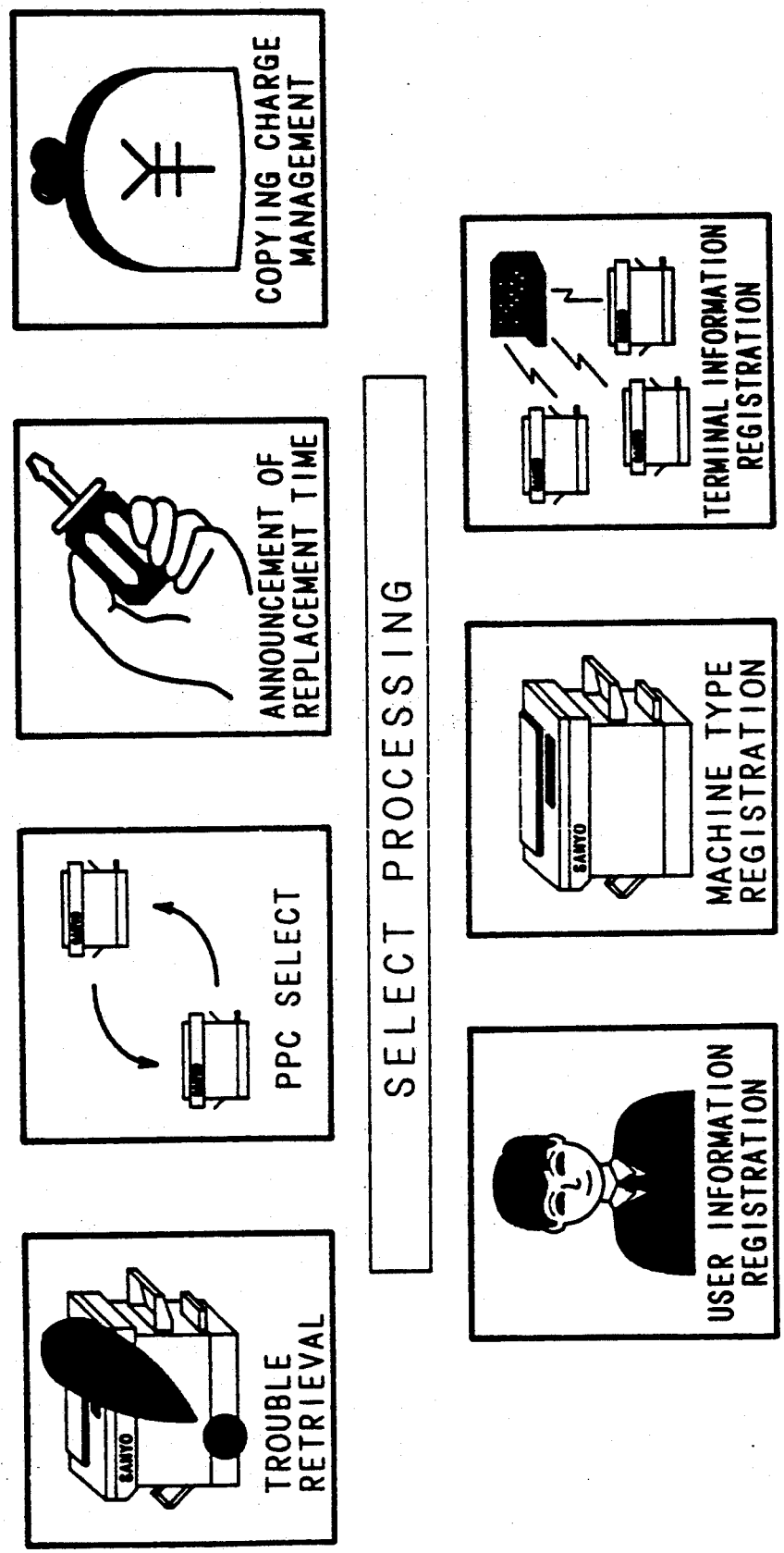

The menu display is displayed, as shown in FIG. 15, at the end of time when the center device 4 is started by Power ON and when each display screen is continuously skipped by Return. In this menu display, seven processing menus are displayed such as "trouble retrieval" "PPC select" "announcement of replacement time" "copying charge management" "user information registration" "machine type registration" and "terminal information registration" with icons and the operator selects processing by selecting an icon by the mouse 28. Further, when there is a troubled terminal at present, "trouble retrieval" icon blinks to alarm this. Also when there is a terminal requiring parts replacement, "announcement of replacement time" icon blinks to alarm this.

The PPC select menu is displayed when "PPC select" is selected in the menu display or when returning after calling "PPC condition display" from the PPC select menu. In this case, a terminal number of the copying machine 1, user name, and a machine type name are displayed (FIG. 17), and a copying machine to be an object of information processing in the PPC condition display is selected. A copying machine in trouble and a copying machine requiring parts replacement are displayed (FIGS. 18 and 19). Particularly in the case of trouble occurrence, this condition is also displayed in bottom right of the screen. As mentioned above, by moving the cursor of a white arrow to the terminal, user or machine type space of the upper row by the mouse 28, terminal information, user information or machine type information can be window-displayed (FIG. 20).

Figure 30:
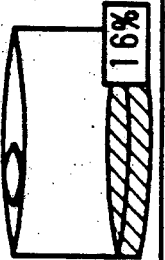
Figure 32:
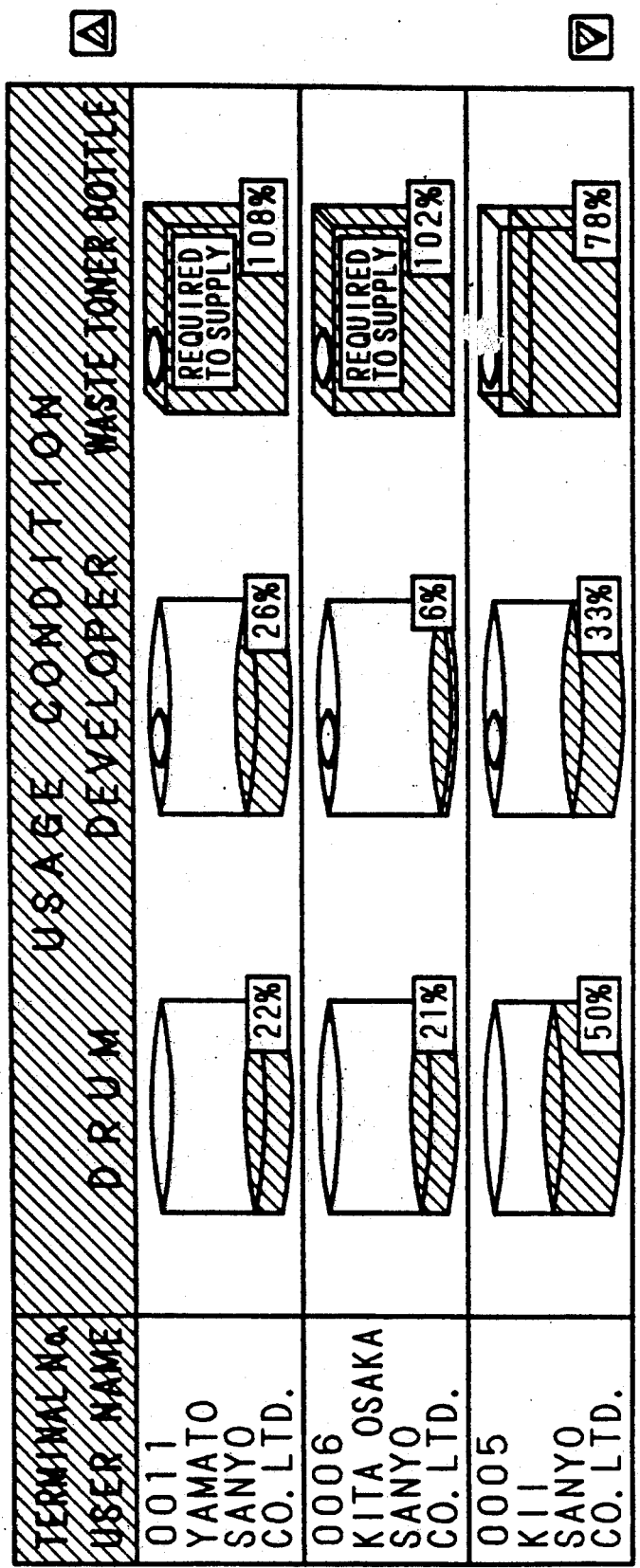

The announcement of replacement time is displayed when "announcement of replacement time" is selected from the menu display or when returning after calling "PPC condition display" from "announcement of replacement time". In this case, the copying machines are displayed in the order from one having the highest usage ratio of the replacement parts of photosensitive drums, developer, and waster toner bottles (FIG. 30). In this case, when selecting prediction, a diagram predicting the next replacement day (FIGS. 31, 32) can be displayed on the basis of the usage ratio and a number of copies up to the present time.

A copying charge display is displayed when "copying charge management" is selected in the menu display. The copying charge during the last one year is calculated monthly and displayed at every copying machine (FIG. 34). According to the contents of the display, the bills are issued. For closing accounts a calculation day of monthly copying charge is set to calculate the charge (FIG. 35) and bills of the copying charge are printed.

Figure 21:
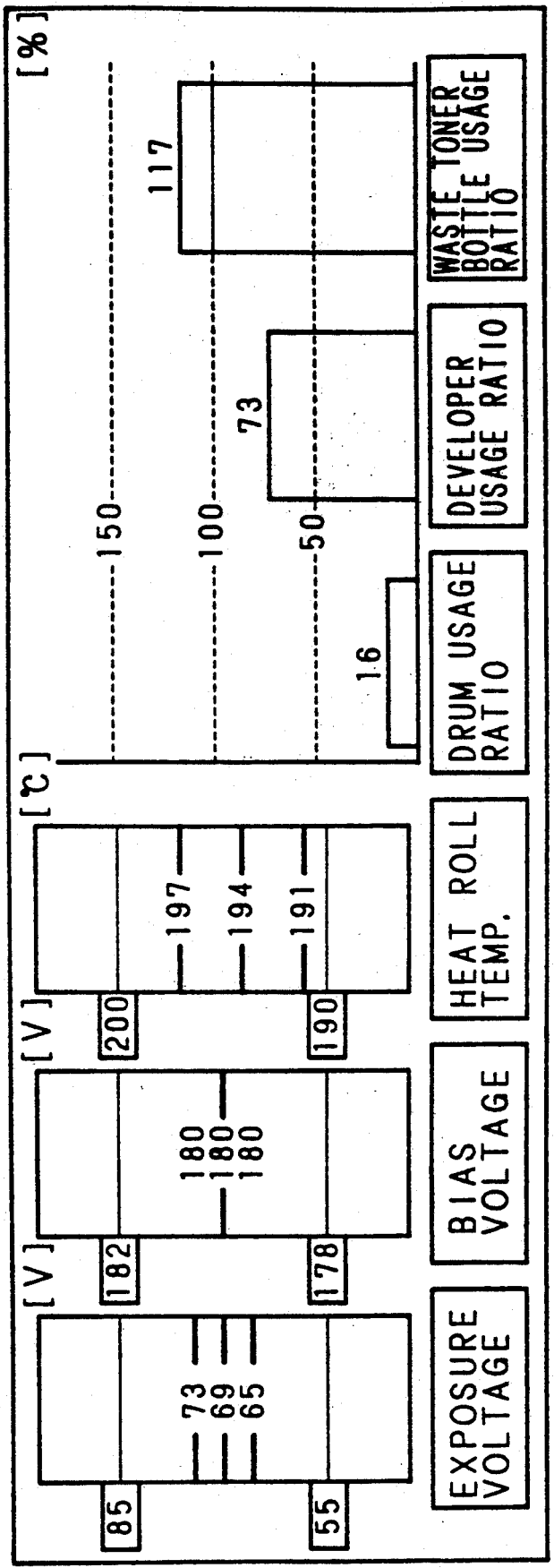

The PPC condition display is displayed when "condition monitor" is selected from the PPC select menu display or announcement of replacement time display, or when "trouble retrieval" is selected from the menu display during trouble occurrence, or when "return" is selected from the PPC performance record display, PPC replacement record display or the PPC number of copies (FIG. 21). Here, number of copies trouble condition, maximum, minimum and mean values basing on measured data of exposure voltages, development bias voltages and heat roller temperatures, and the usage ratio of the replacement parts such as photosensitive drums, developer, and waster toner bottles are displayed.

Figure 33:
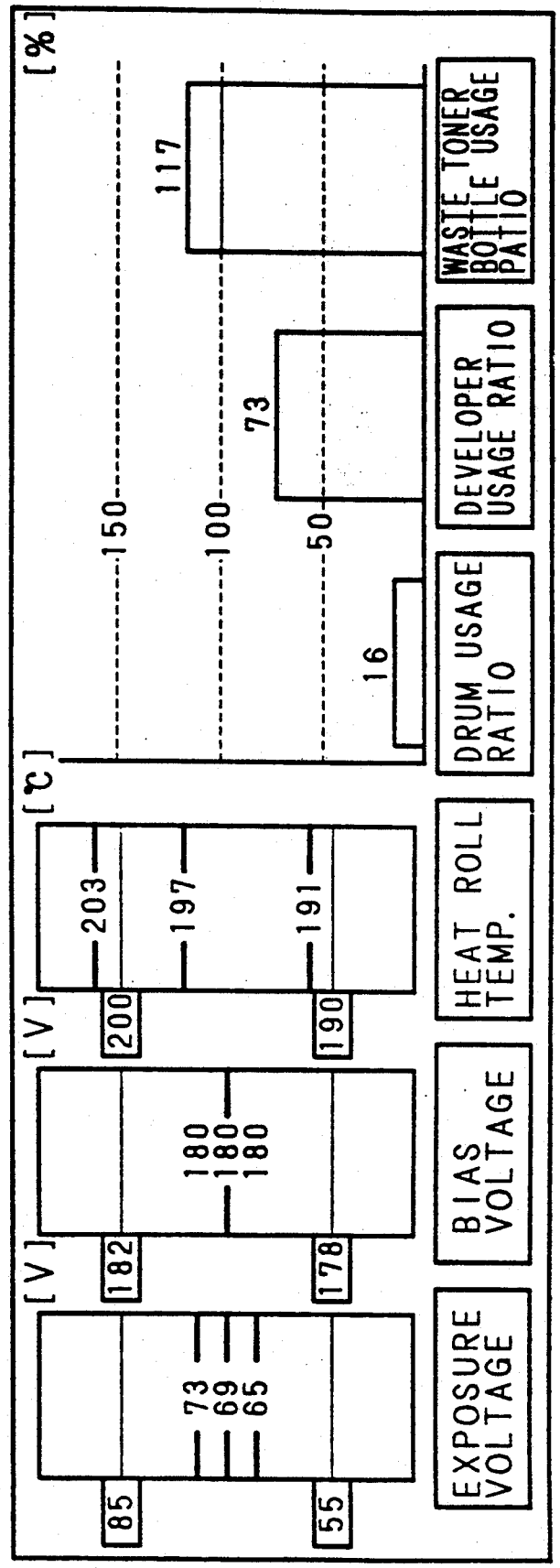

When the maximum or minimum values of the measured data exceeds a proper range, those measured data are displayed in red. Further when the usage ratio of the replacement parts exceeds 100%, those replacement parts are displayed in red. In this display, troubled copying machines are sorted in order of a terminal number and displayed when calling from the "trouble retrieval", thereby the trouble retrieval is promptly performed. Further, when calling from "announcement of replacement time" the copying machines are displayed in order of high usage ratio. When calling from "PPC select" the copying machines are displayed in ascending order of the terminal number. When a copying machine causes abnormality during "PPC condition monitor" the trouble position is displayed in the area of trouble condition and also information indicating trouble occurrence is displayed in the right lower corner (FIG. 33). This display shows that the temperature of the heat roller is abnormal, thus causing abnormal fixing. Other troubles such as a scanner abnormality are similarly displayed.

Figure 23:
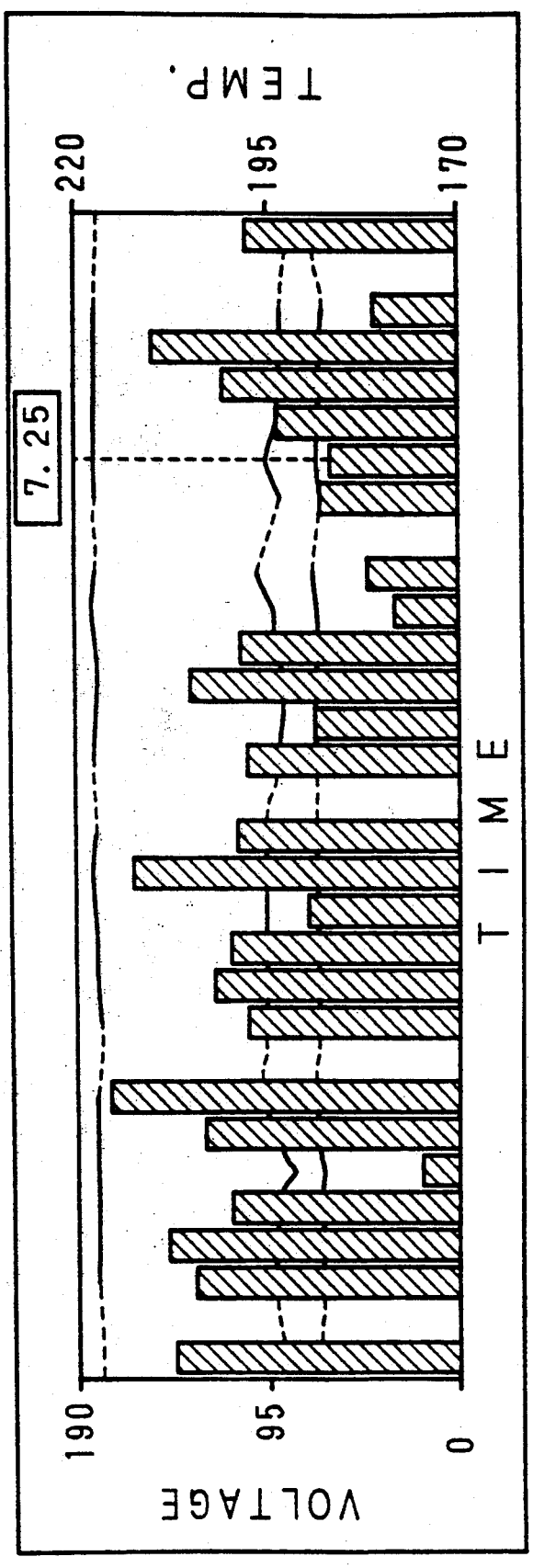
Figure 24:
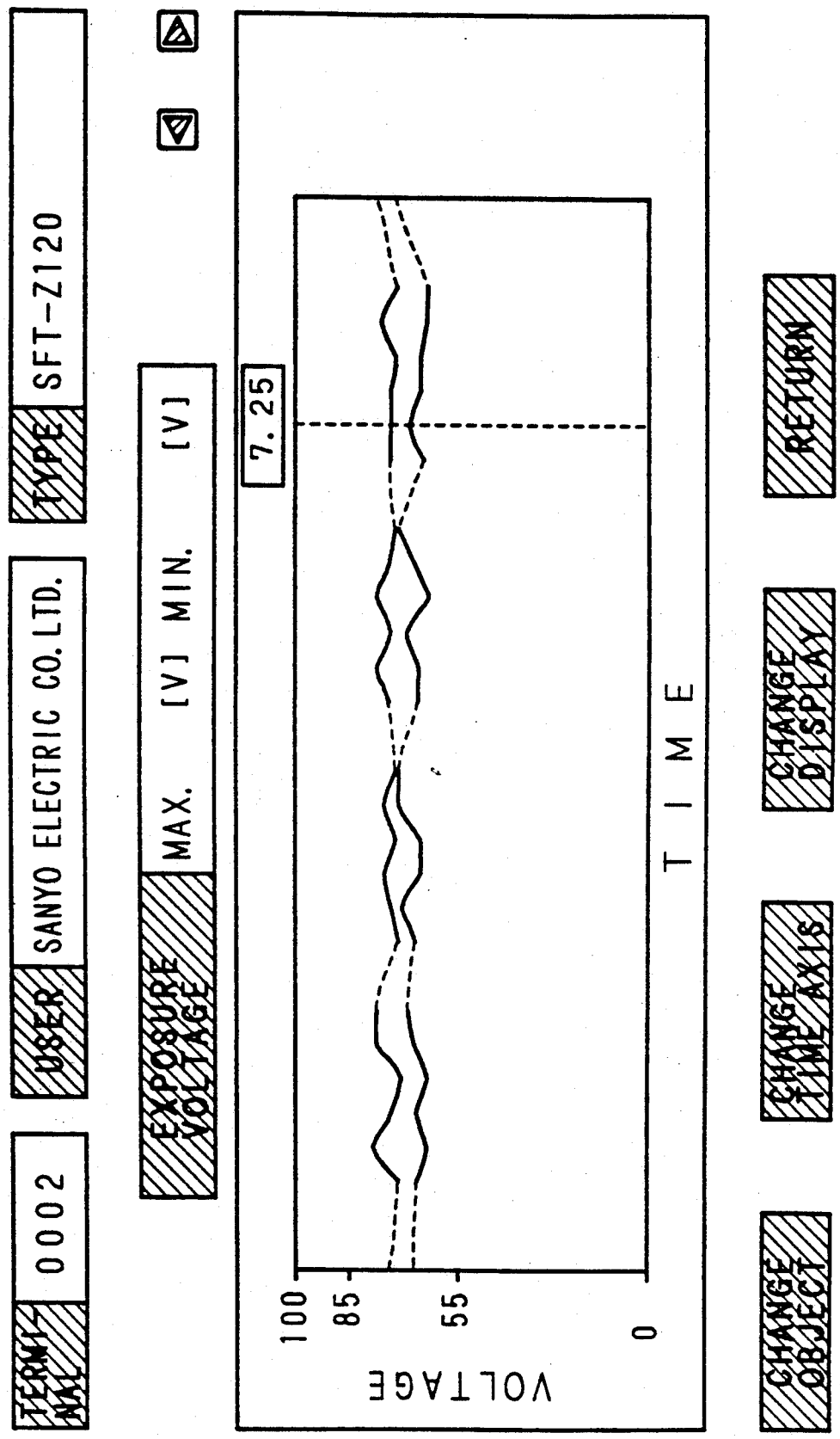

The PPC condition record display is displayed by selecting "MENU" from the PPC condition display to display a submenu (FIG. 22) and by selecting "PPC performance record". In this display, mean values variation of exposure voltages, development bias voltages, heat roller temperatures are displayed taking week, month, or year as a time axis (FIG. 23). The maximum and minimum values variation of measured data indicative of their performance are also displayed taking week, month or year as a time axis (FIG. 24).

The PPC trouble record display is displayed by selecting "MENU" from the PPC condition display to display a submenu (FIG. 22) and by selecting "PPC trouble record". In this display, trouble occurring month, contents of troubles and exposure voltages, development bias voltages, heat roller temperatures at that time and reception time are displayed (FIG. 25). Among these data, those exceeding the proper range are displayed in red.

Figure 26:
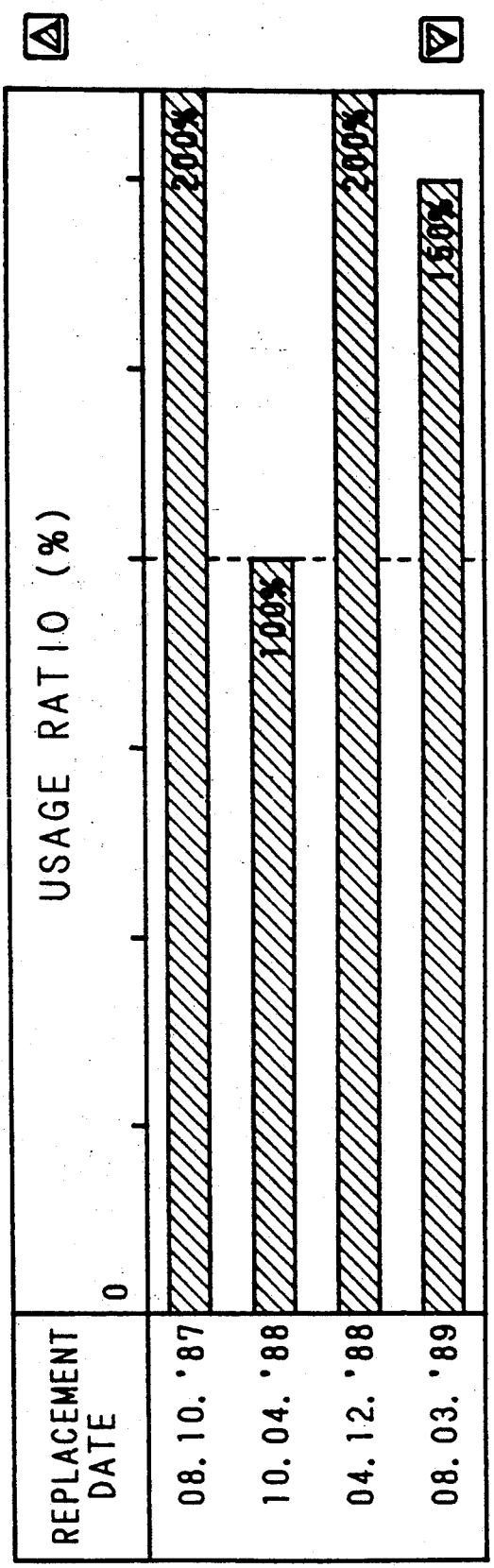

The PPC replacement record display is displayed similarly by making the submenu display and selecting "PPC replacement record". In this display, replacement date of the parts such as the photosensitive drums, developer, waste toner bottles and the parts usage ratio at that time are displayed (FIG. 26).

Figure 27:
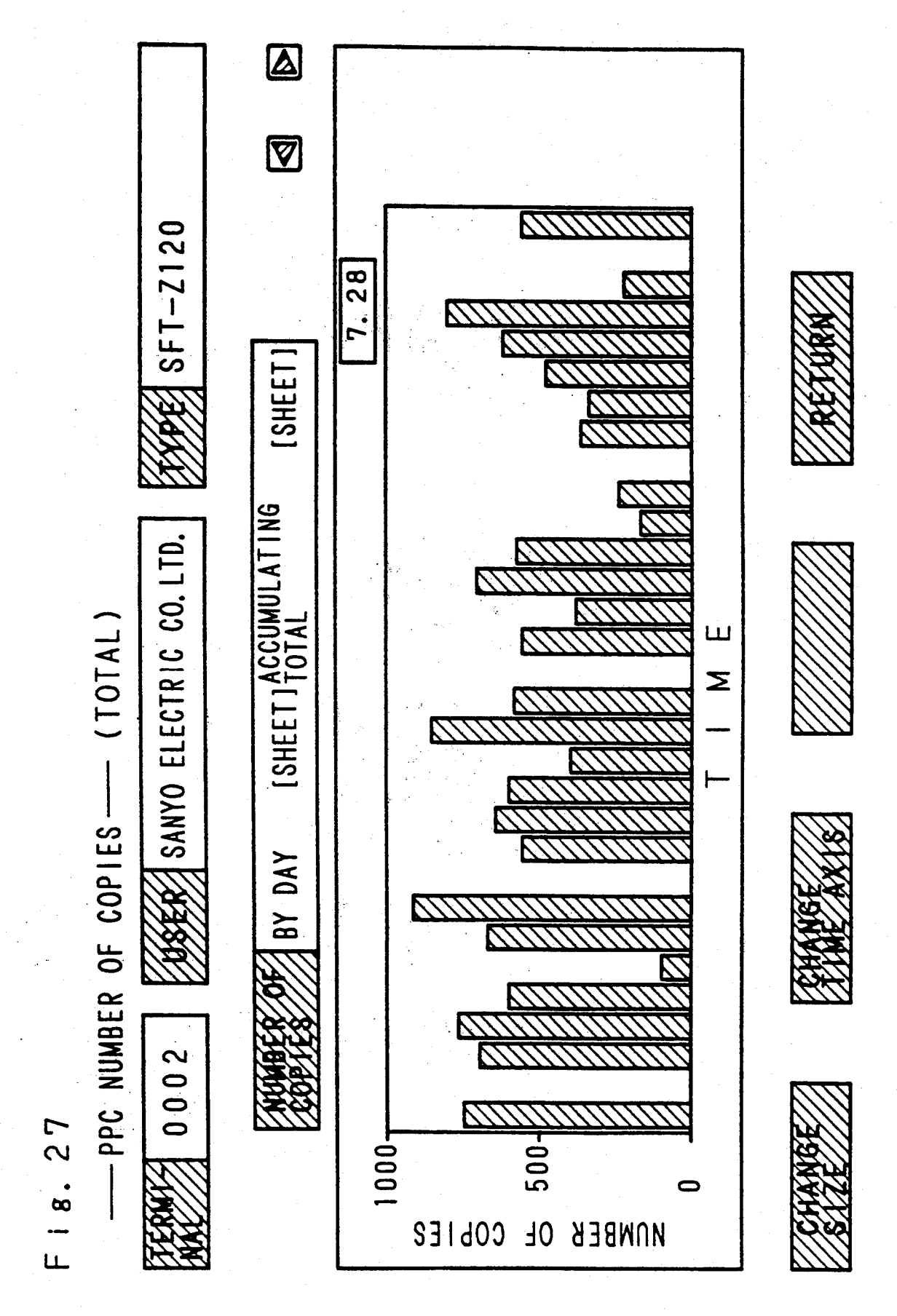
Figure 28:
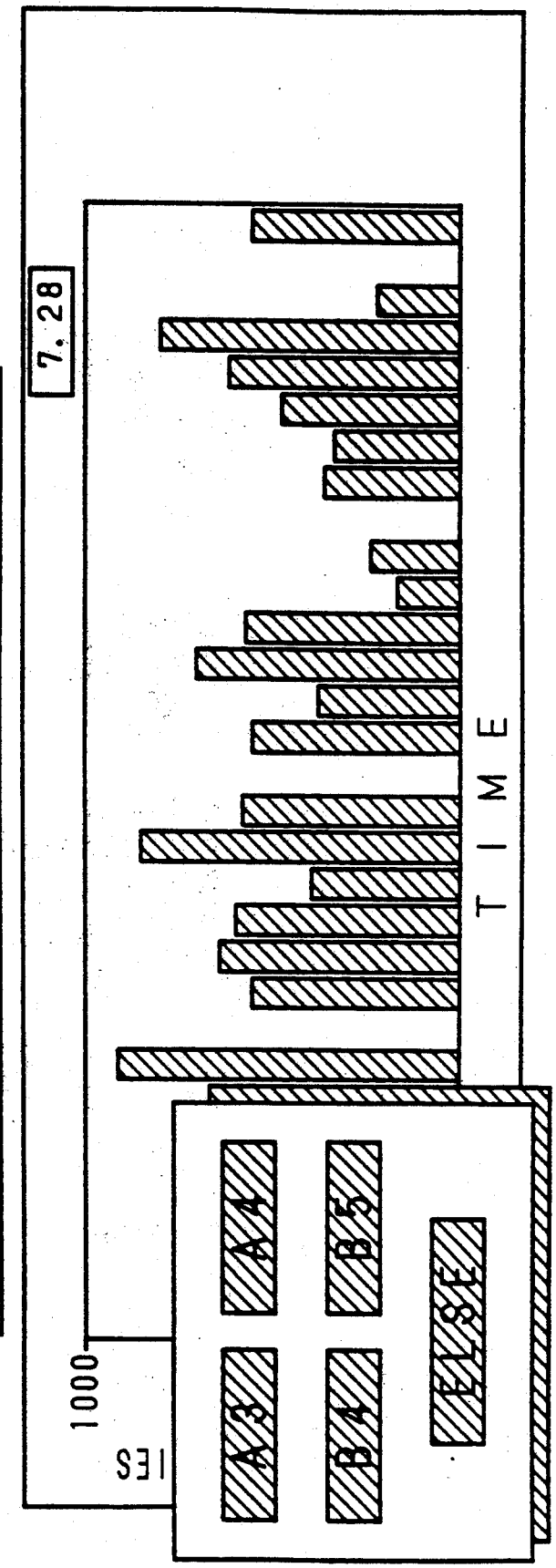
Figure 29:
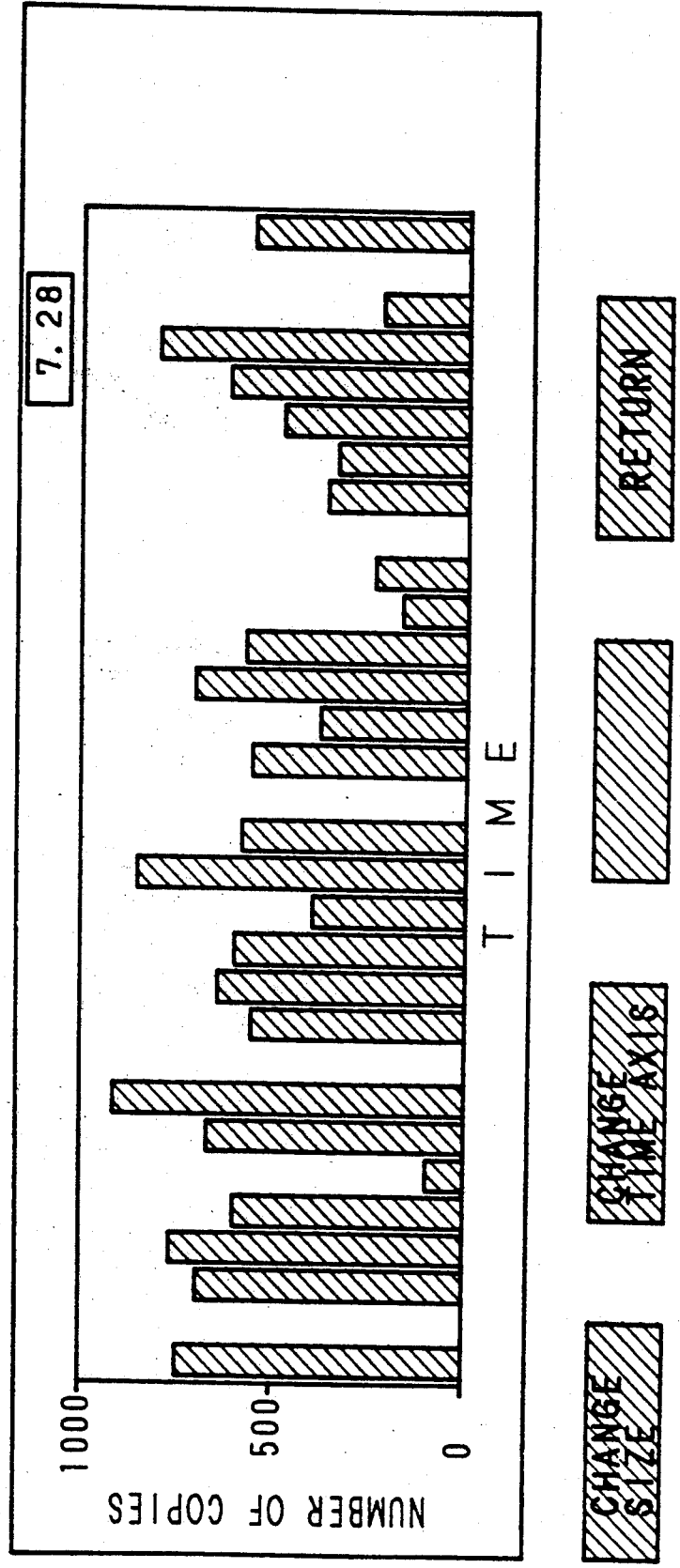

The PPC number of copies display is displayed similarly by making the submenu display and selecting "PPC numbers of copies". In this display, variations in the number of copies of each paper size are displayed taking week, month or year as the time axis (FIGS. 27 to 29).

The user registration is displayed when "user registration" is selected from the menu display. In this display, registration, change and deletion of user information such as user names, telephone numbers, ZIP codes and addresses are performed (FIG. 36).

The machine type registration is displayed when "machine type registration" is selected from the menu display. In this display, registration, change and deletion of machine type information such as machine types, proper ranges of exposure voltages, development bias voltages and heat roller temperatures, replacement of photosensitive drums, developer, waste toner bottles and a number of copies are performed (FIG. 37).

The terminal registration is displayed when "terminal registration" is selected from the menu display, and registration, change and deletion of terminal information such as terminal numbers, machine types, serial numbers, and user names are performed (FIG. 38).

Numeral values displayed on the data display unit 236 are calculated by the following calculation.

| | |
|---|---|
| drum usage ratio = | {(accumulating total numbers of copies) − (accumulating total number of copies at a drum replacement time)}/(accumulating total number of copies at a drum replacement time) × 100% |

The usage ratios of developer and waste toner bottles are calculated in the same way as the drum. The copy charge is calculated from the minimum charge plus copy charge decided corresponding to copies number.

The file store unit 234 stores the following seven data files. The data files information is roughly classified into terminal common information and terminal discrete information. For the terminal common information, the following four files are provided:
(1) PPC terminal information file
(2) PPC user information file
(3) PPC charge data file
(4) PPC machine type information file.

For the terminal discrete information, the following three discrete files are provided;
(1) PPC data file
(2) PPC parts replacement file
(3) PPC trouble record file.

The PPC terminal information file is a file for storing data registered, changed and deleted by terminal registration, and controls correspondence of a terminal number to a machine type name, serial number and a user name. This file records are sorted in order of the terminal number. The sort is performed at the time of registration to update the file.

The PPC user information file is a file for storing data registered, changed and deleted by user registration, and controls user names, ZIP codes, addresses and telephone numbers. This file records are sorted according to user names. The sort is performed at the time of registration to update the file.

The PPC charge data file controls a monthly number of copies of each paper size of a copying machine and a monthly charge.

The PPC machine type information file is a file for storing data registered, changed, and deleted by machine type registration, and controls proper ranges of exposure voltages, development bias voltages, heat roller temperatures, replacement of photosensitive drums, developer, waste toner bottles and numbers of copies.

The PPC data file controls various kinds of data such as numbers of copies, exposure voltages, development bias voltages, head roller temperatures, and trouble conditions which are transmitted from the communication unit 3. This file controls data collected by the fixed time call during 365(366) days from 1st Jan. to 31th Dec. and records data transmitted last. Further, it records a final number of copies, accumulated total number of copies, accumulated total number of copies at the time of drum replacement, accumulated total number of copies at the time of developer replacement and an accumulated total number of copies at the time of waste toner bottles replacement.

The PPC parts replacement record file controls dates and times of parts replacement, a number of copies at the time of the replacement.

The PPC trouble record file controls dates and times of trouble occurrence, exposure voltages, development bias voltages, and heat roller temperatures. This file adds data every time abnormality occurs.

Now, processing performed by the center device 4 will be explained.

Figure 12:
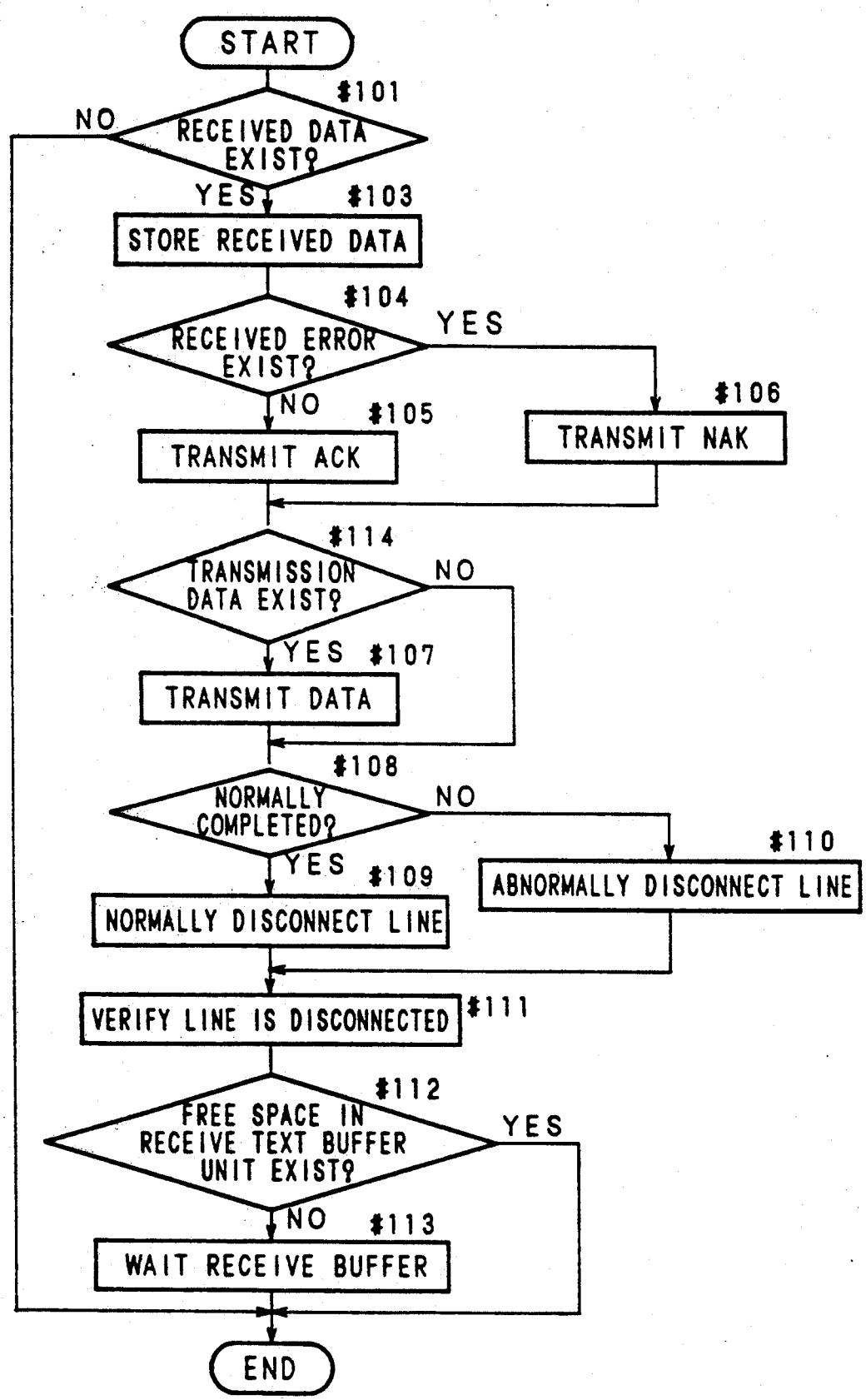
FIG. 12 is a flowchart showing contents of processing of a transmitter-receive unit.

FIG. 12 is a flowchart showing contents of processing performed by the transmitter-receive unit of the central processing unit. It first monitors a condition of the modem 22, checks existence of received data from the communication unit 3 (step #101), finishes processing when there is no data or executes data storing processing for storing received data in the receive text buffer unit 232 when data is received (step #103). Next it decides existence of a received error (step #104). In this step, a received error is decided by parity check or whether A, B, C and D following the ≃ indicative of message data spacing are correctly received in order of this sequence or not. When a received error exists, the unit 231 executes NAK transmittance processing which transmits NAK signal to the communication unit 3 which is made to send data again (step #106), and when no received error exists the unit 231 performs ACK transmittance processing which transmits ACK signal indicative of normal reception to the communication unit 3 (step #105).

Next, the unit 231 decides whether itself sends instruction data shown in FIG. 7 or not in the case of time set, that is, whether there is data or not which is to be transmitted from the center device 4 to the communication unit 3. When there is data to be transmitted, the unit 231 executes data transmittances processing (step #107), and when there is no data the unit 231 skips the step #107 and decides whether processing is normally completed or not (step #108). In this step the unit 231 decides whether processing is normally completed or not by whether the communication line is disconnected or not during communication. When normally completed, the unit 231 performs normal disconnecting line processing which resets an abnormality disconnecting flag (not shown, step #109), and when not normally completed, the unit 231 performs abnormal disconnecting line processing (step #110).

Next, the unit 231 verifies by a predetermined flag that the line is actually disconnected (step #111), and checks existences of a free space in a receive text buffer unit 232 (step #112). When the recessive text buffer unit 232 is full, the unit 231 executes processing of receive buffer wait which inhibits automatic receive and answering (step #113) and completes the processing.

Figure 13A:
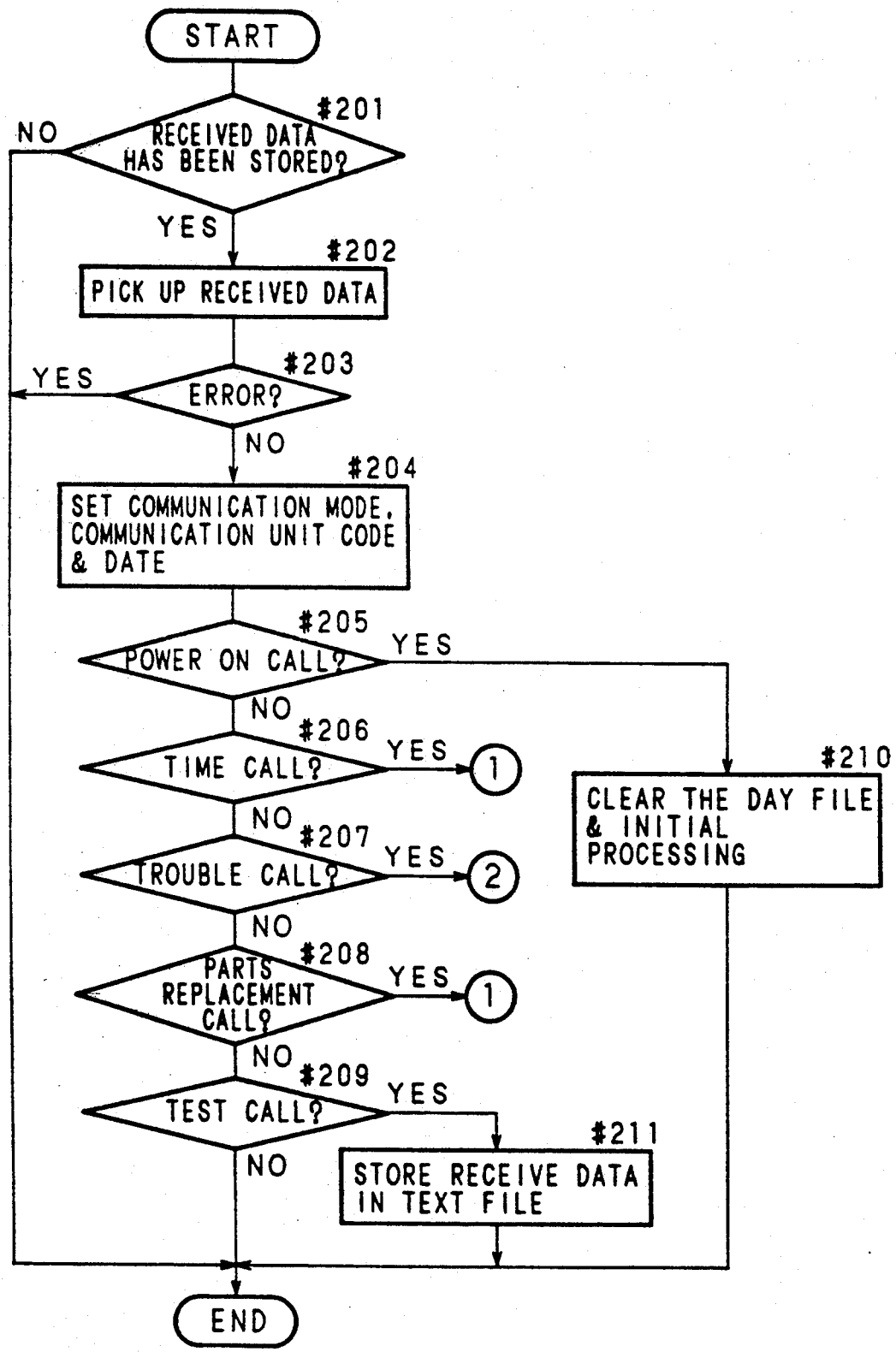
FIGS. 13(a) to 13(c) are flowcharts showing contents of processing of a receive text processing unit.
Figure 13B:
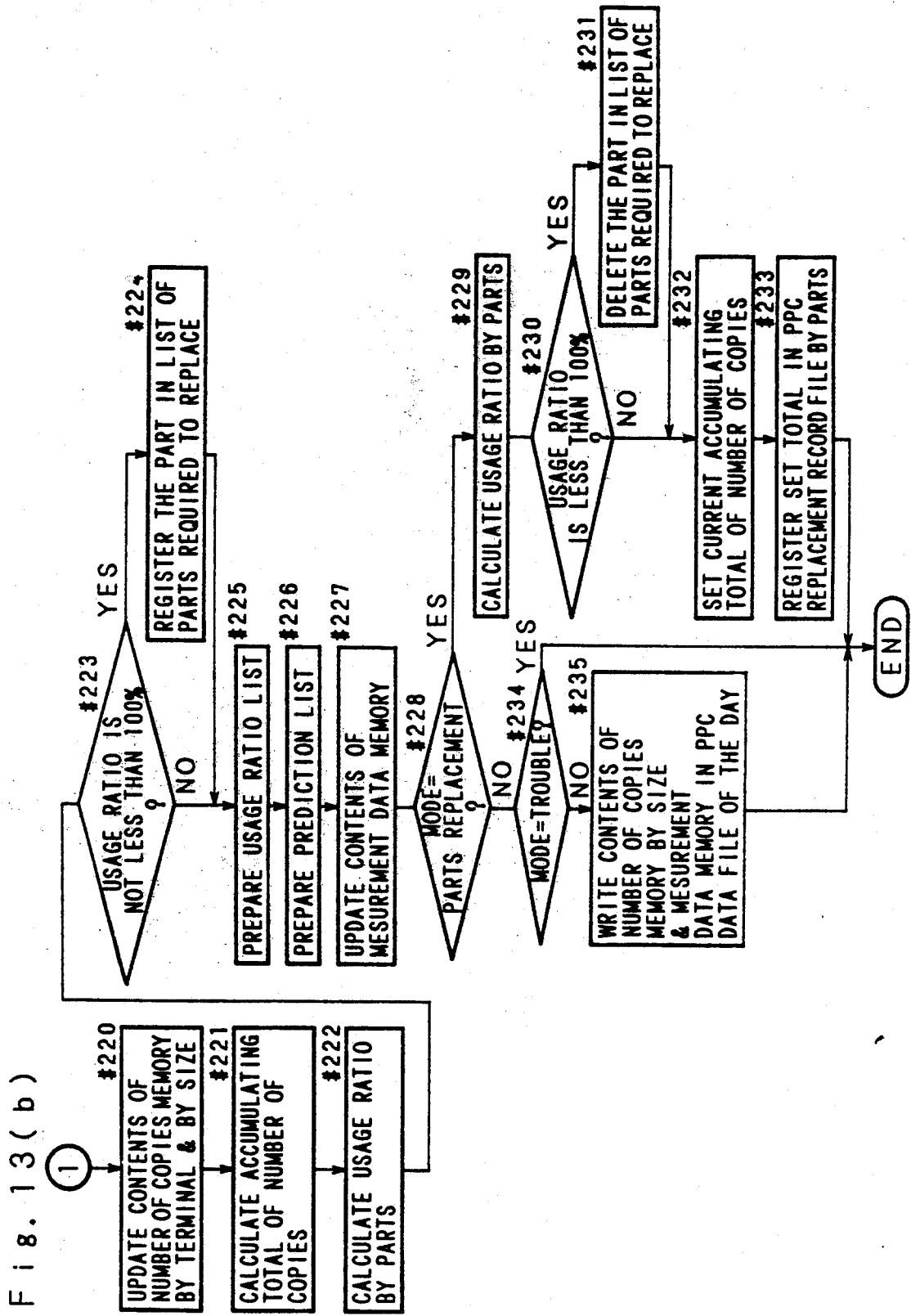
Figure 13C:
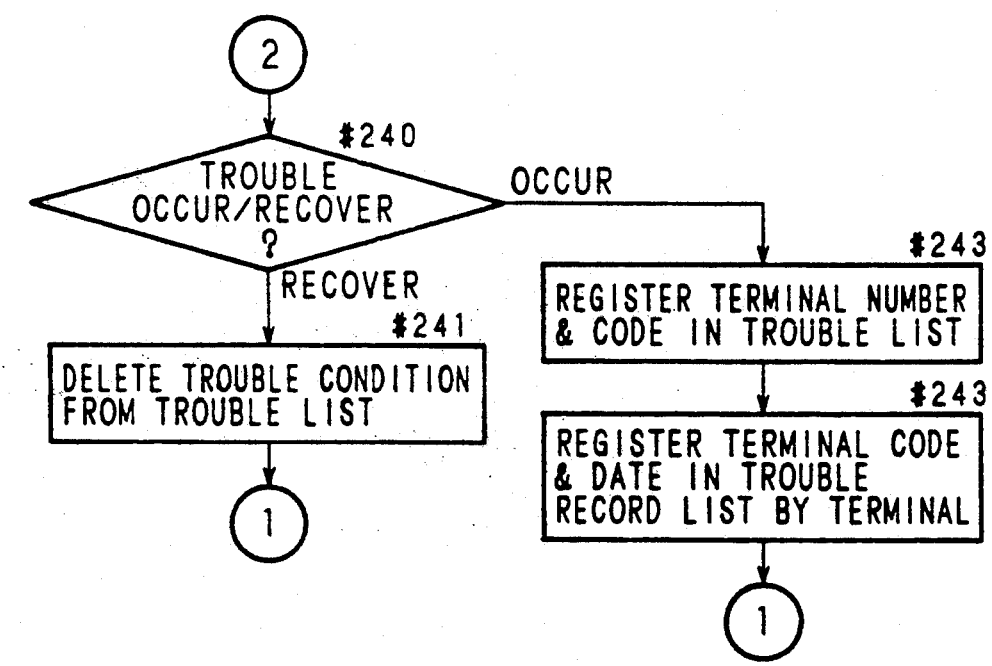

Now, processing executed by the receive text processing unit 233 will be explained referring to flowcharts of FIGS. 13(a), 13(b) and 13(c).

The receive text processing unit 233 first decides whether the receive text buffer unit 232 has stored a received text or not (step #201), and when the received text has been stored, the unit 233 performs received data pick up processing which reads the stored text (step #202), and executes received text format check to decide existence of an error (step #203). When there is no error in the received text, the unit 233 sets a communication mode, communication unit code and a date (step #204), and decides type of call between step #205-step #209. When Power ON call, the unit 233 performs initial processing which clears the day files (step #210) and completes the processing. When test call is performed, the unit 233 stores test file receive data not shown (step #211) and completes the processing. In the case of the time call and parts replacement call, the unit 233 updates contents of numbers of copies memory by terminals and by sizes at step #220 and calculates accumulating total number of copies (step #221) and calculates each usage ratio by above parts (step #222) and decides whether the usage ratio becomes more than 100% or not (step #223). When the usage ratio of a part exceeds 100%, the unit 233 registers this part in a list of parts required to be replaced (step #224).

The unit 233 prepares a usage ratio list of parts (step #225), and on the basis of this list prepares a prediction list (step #226). The unit 233 produces the prediction list by predicting usage of each replacement part in one week or one month future using actual usage data, and then updates contents of measurement data memory on the basis of received data (step #227), and decides whether called mode is for parts replacement or not (step #228). When it is the parts replacement mode, the unit 233 calculates the parts usage ratio (step #229), and decides whether the usage ratio is less than 100% or not (step #230) and, when less than 100%, deletes the part in a list of parts required to be replaced because the part was replaced (step #231). Then the unit 233 sets a current accumulating total of a number of copies (step #232) and registers total number of copies during a period of parts usage on the basis of set total in PPC replacement record file by parts (step #233) and completes the processing.

At the step #228, when the mode is not part replacement mode, the unit 233 then decides whether the mode is trouble call mode or not (step #234) and, when trouble call mode, completes the processing and, when not trouble call mode, writes contents of a number of copies by size memory and measurement data memory into PPC data file of the day (step #235) and completes the processing.

When trouble call at step #207, the unit 233 decides trouble occur/recover (step #240) and, when trouble recover, deletes the trouble condition from the trouble list (step #241), then the processing proceeds to #220. Further, when trouble occur, the unit 233 registers a terminal number and code in the trouble list (step #242) and registers a terminal code and date in the trouble record file by terminal (step #243), then the processing proceeds to #220.

Figure 16:
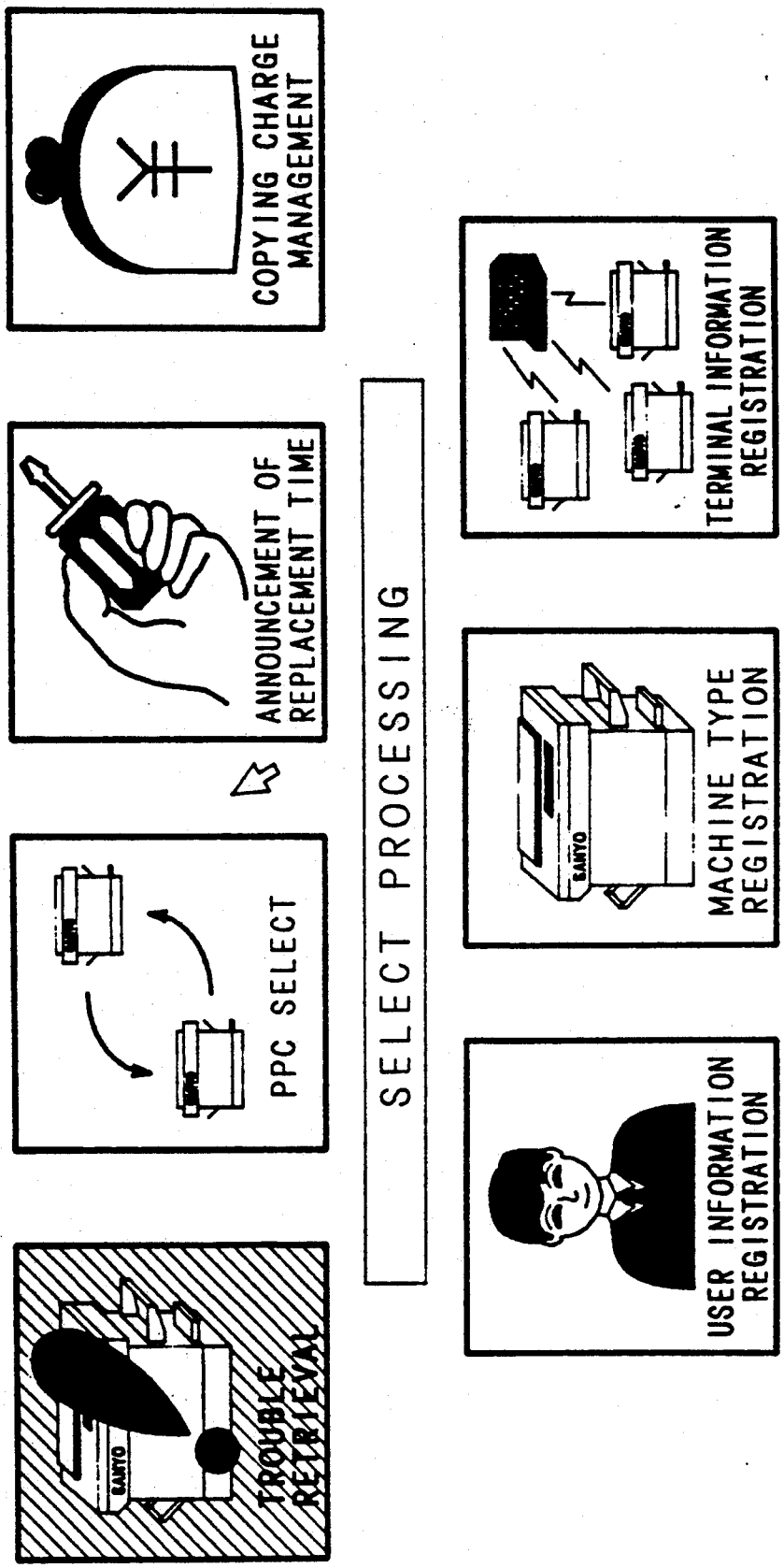

Now, processing performed by the data display unit 236 will be explained referring to flowcharts of FIGS. 14(a) to 14(i). The data display unit 236 first executes initial processing that clears all memory such as an internal video RAM not shown (step #300) and displays menu screens shown in FIG. 15 (step #301). Then the unit 236 decides existence of a trouble list, that is, existence of a troubled copying machine (step #302) and, when the trouble list exists, performs trouble blink processing that blinks a trouble retrieval icon in the menu screen as shown in FIG. 16 (step #303). Next the unit 236 decides existence of a list of parts required replacement, that is, existences of a part exceeding 100% usage ratio (step #304) and, when exists, performs part required replacement blink processing that blinks a replacement time announcement icon in the menu screen (step #305). Then the unit 236 decides existence of input by the mouse 28 click at the step #306 and also decides at the steps #307–#313 which menu has been selected.

Figure 14A:
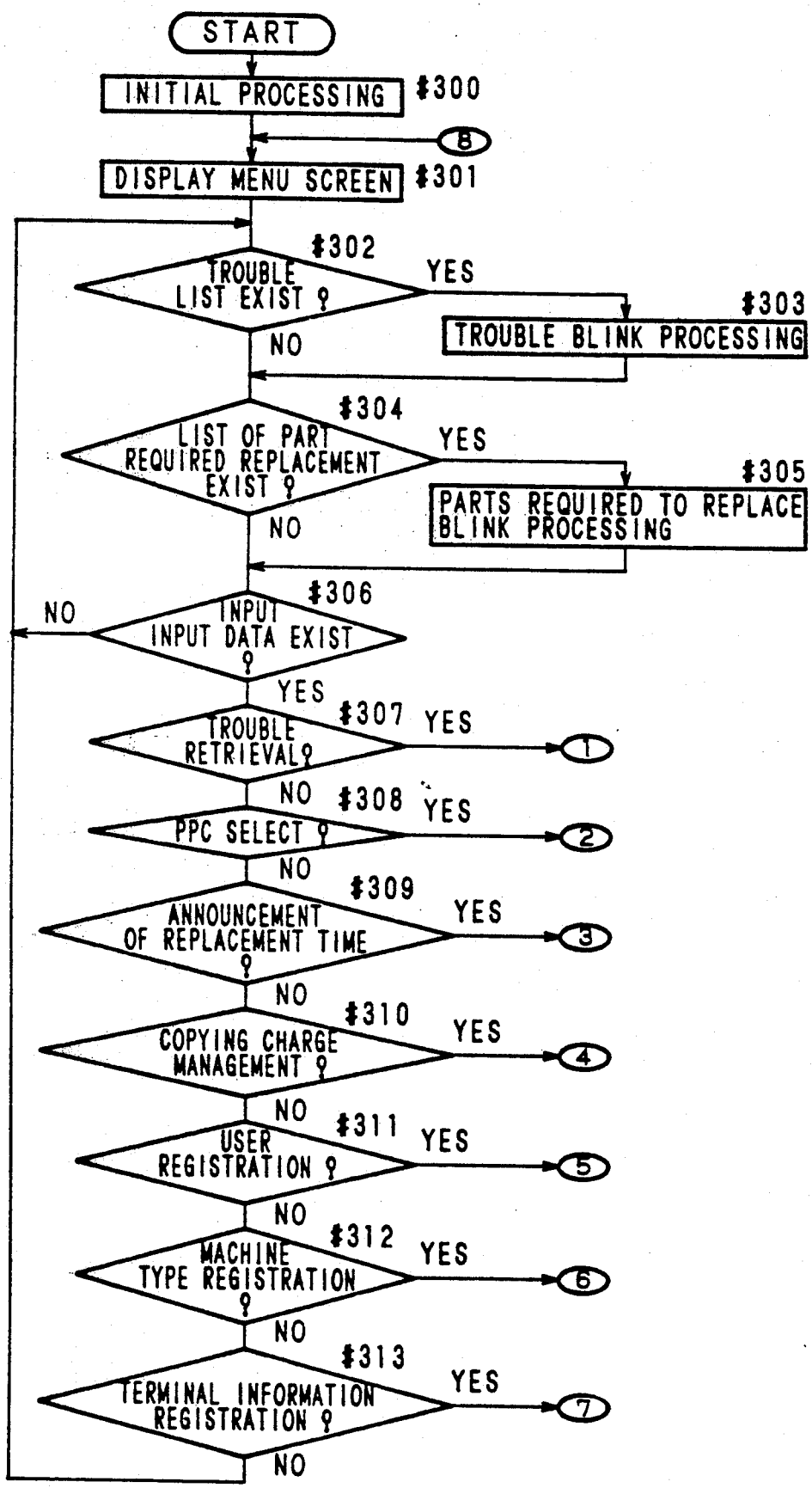
Figure 14B:
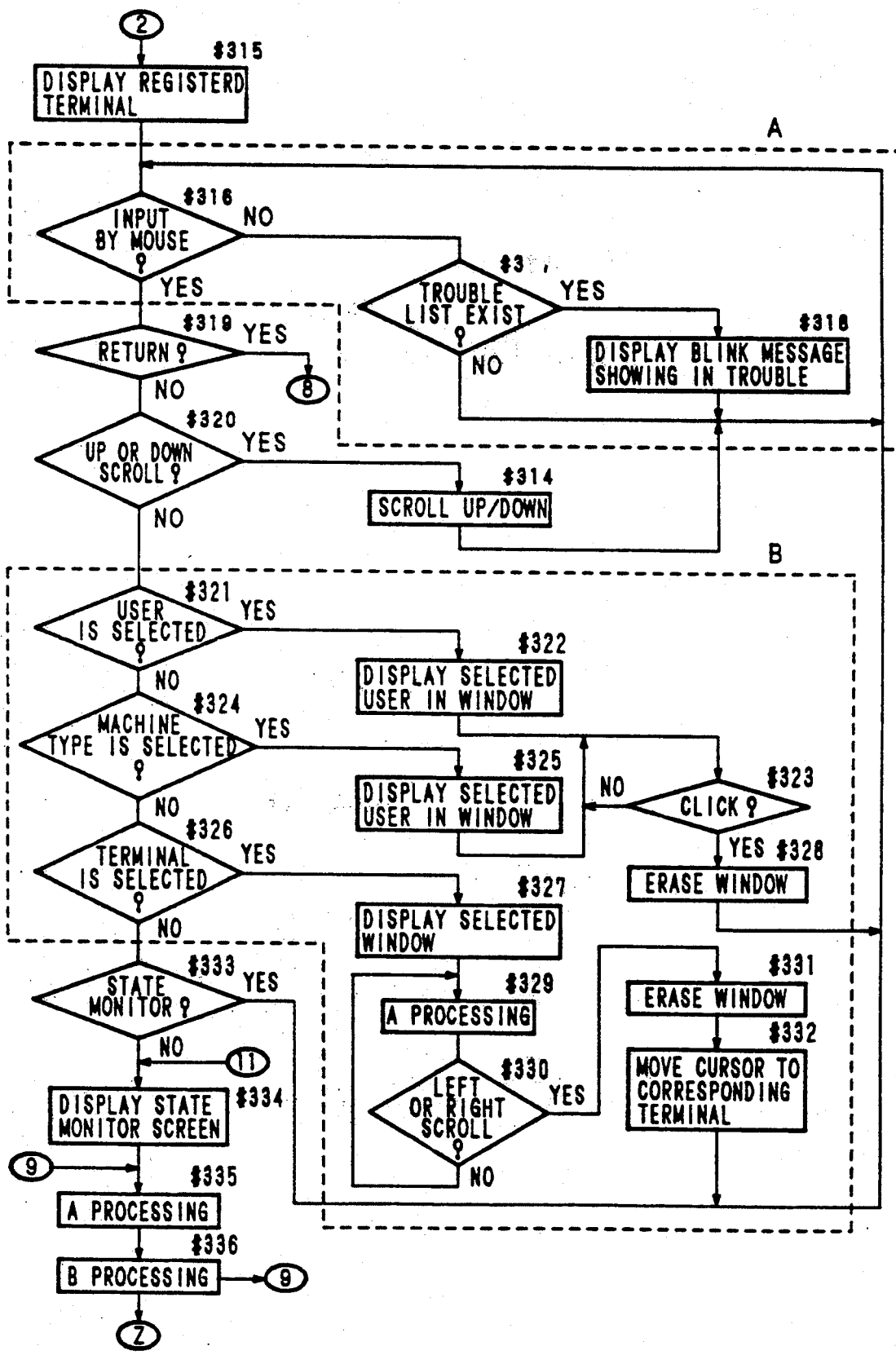
Figure 14C:
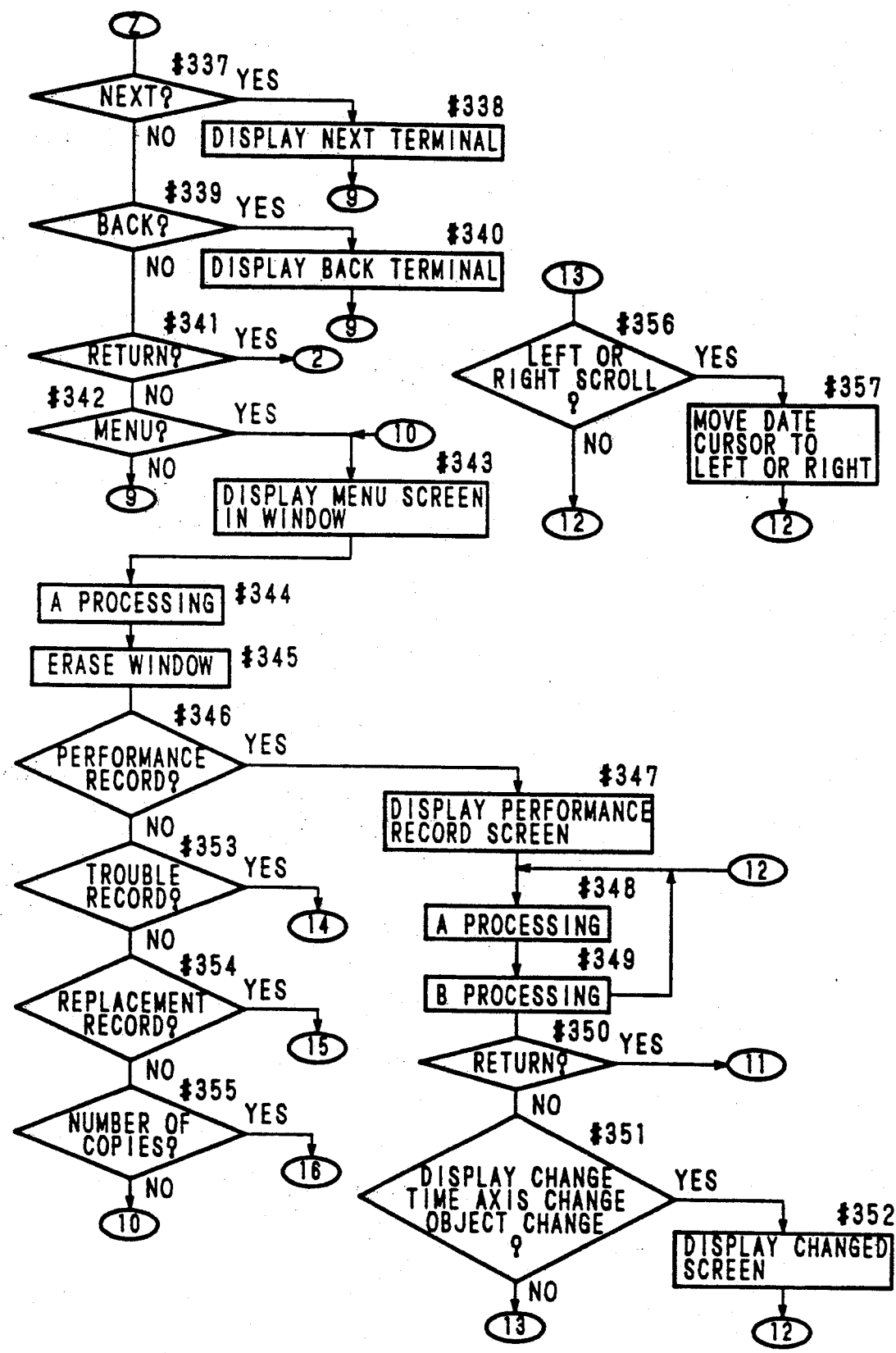
Figure 14D:
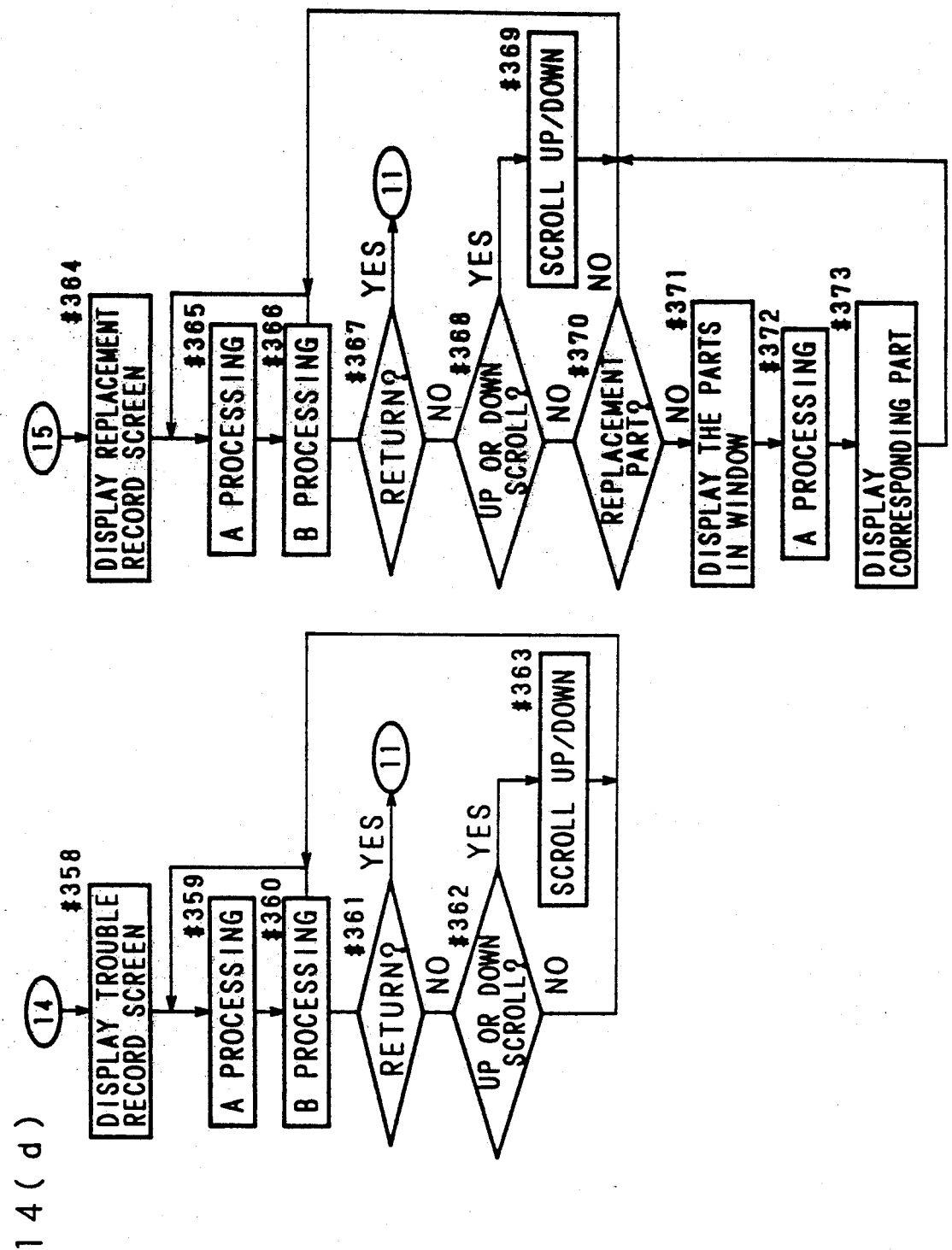
Figure 14E:
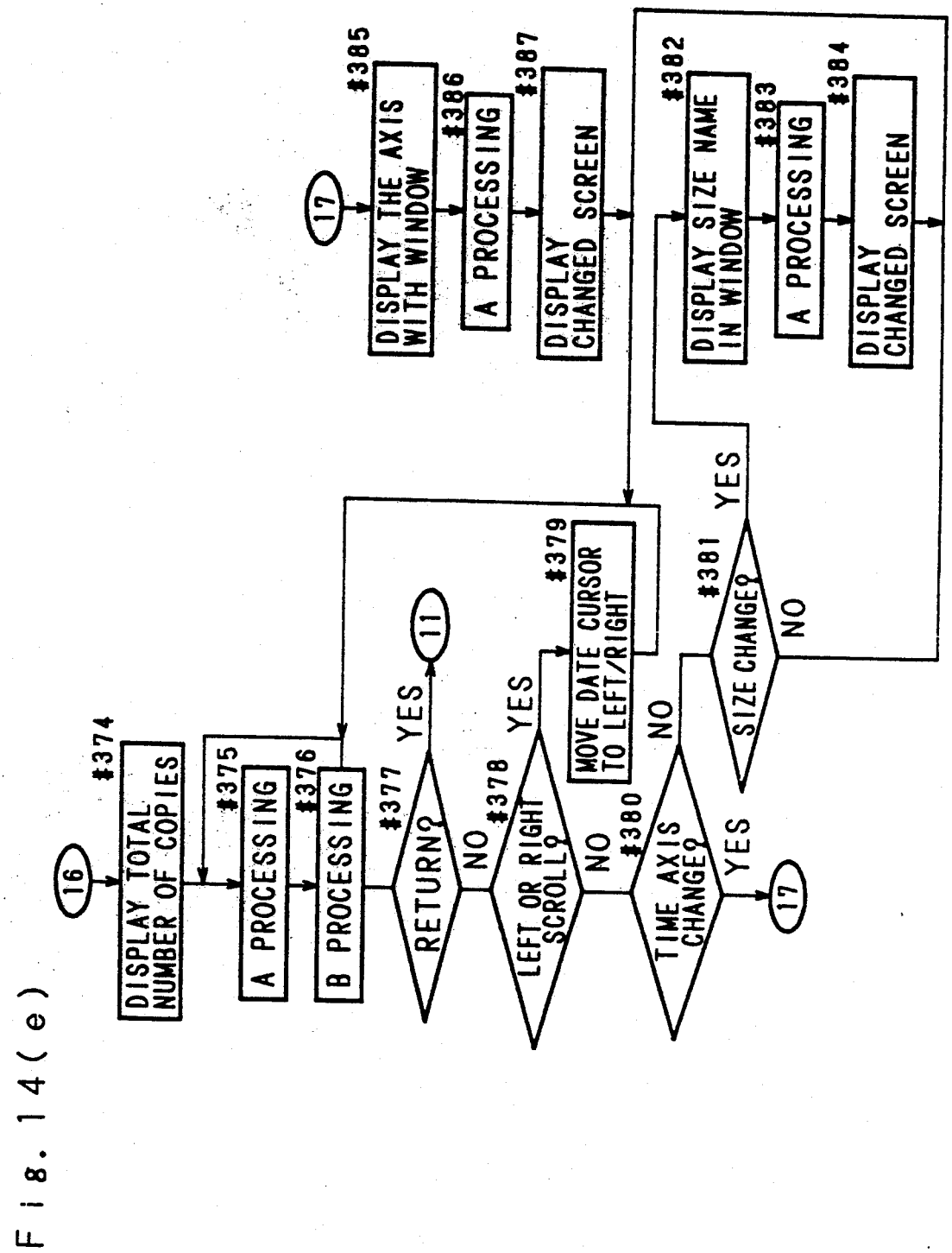
Figure 14F:
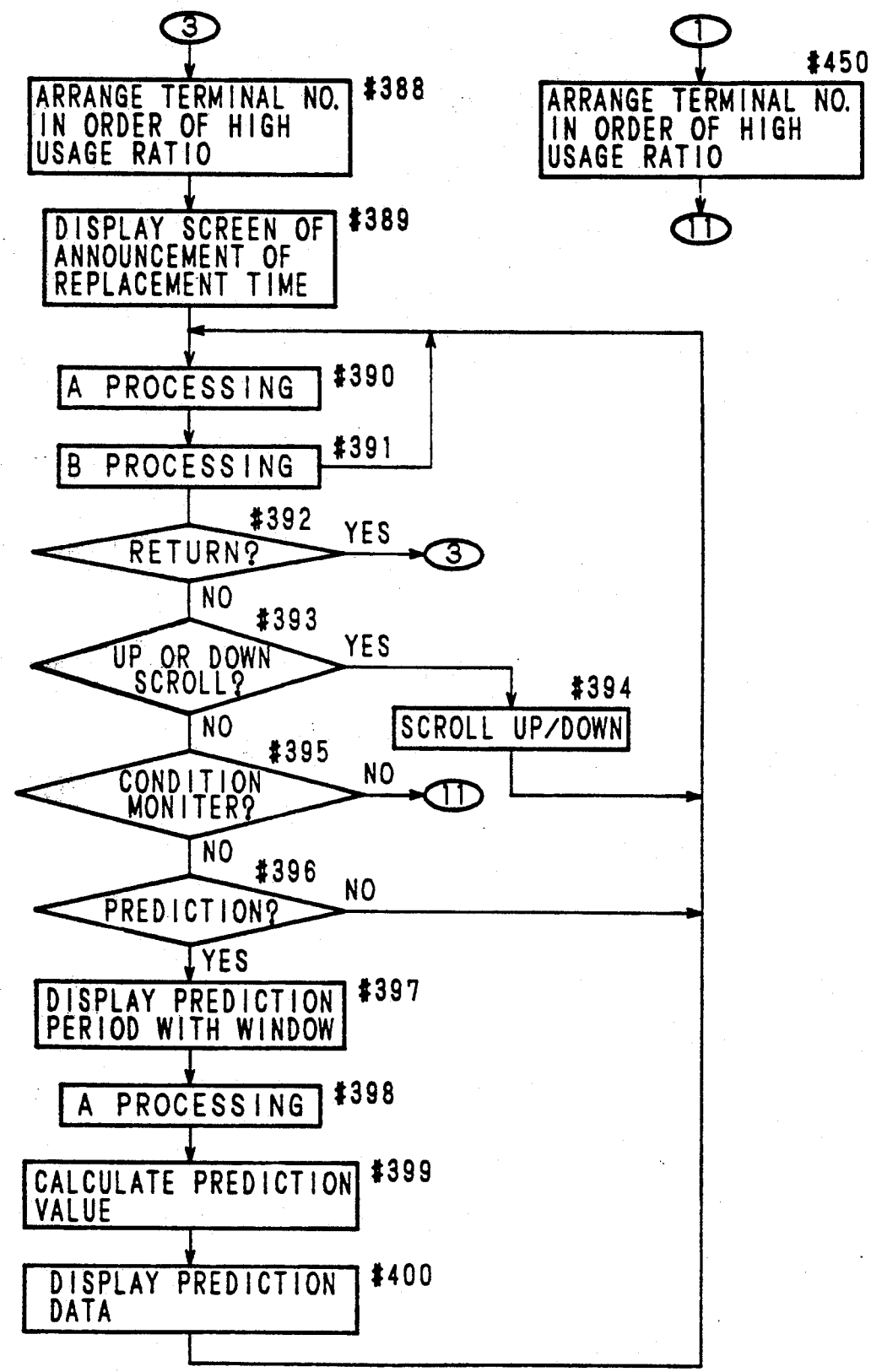
Figure 14G:
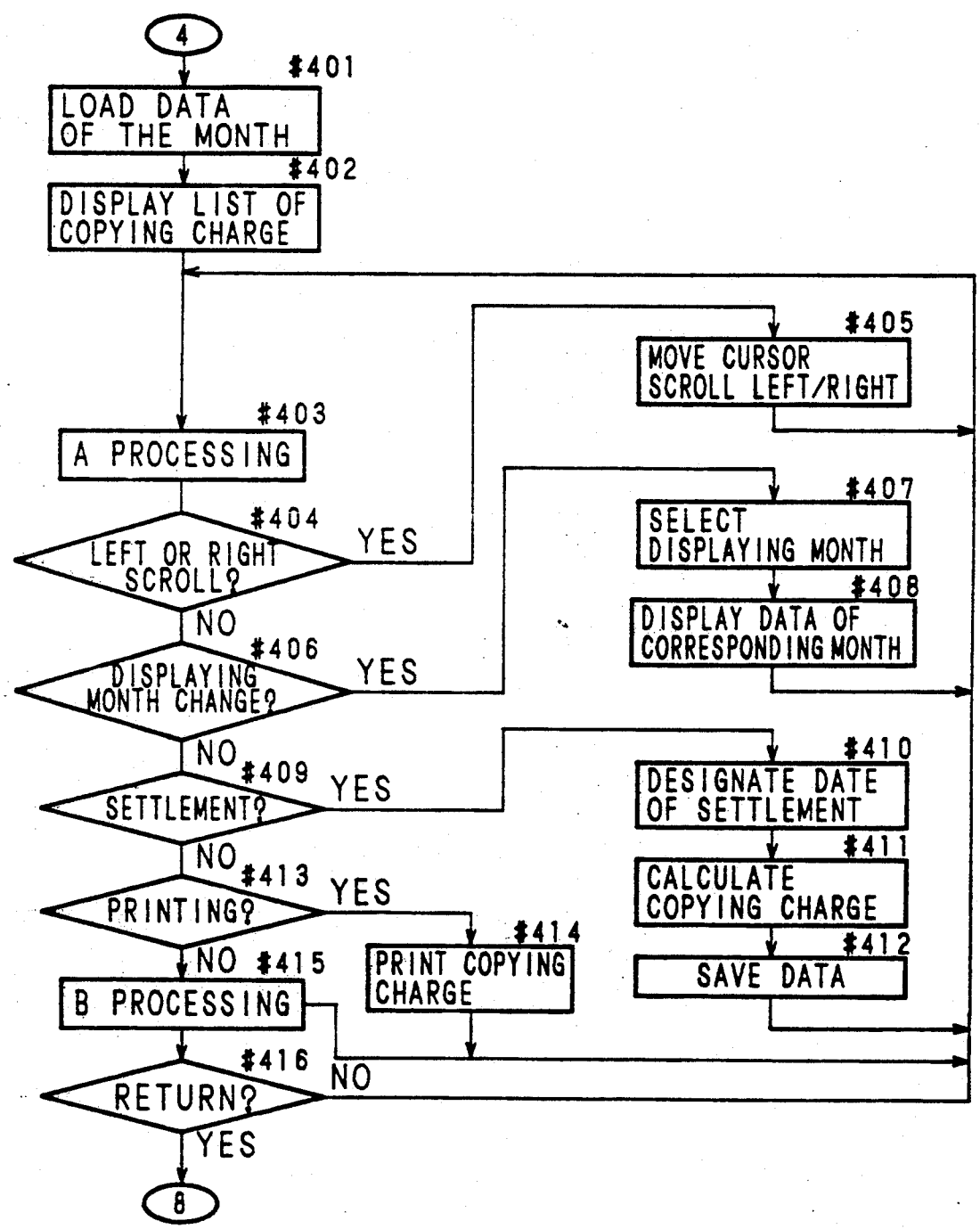
Figure 14H:
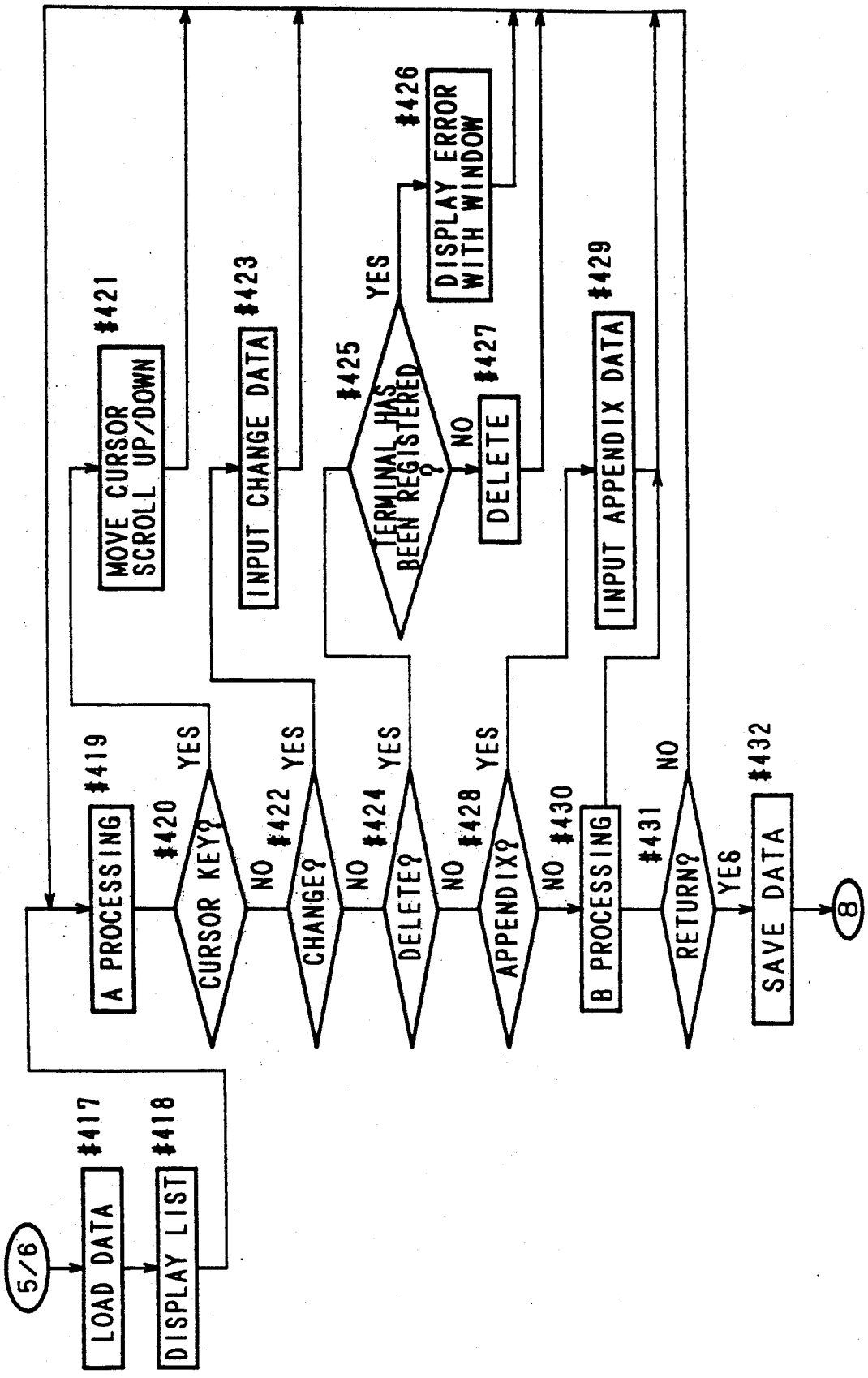

When the unit 236 decides that the trouble retrieval has been selected at step #307, the processing proceeds to #450 as shown in FIG. 14(f) and the unit 236 arranges terminal numbers in order of a trouble list as shown in FIG. 33 and the processing proceeds to #334 described later.

When selecting PPC selection at step #308, the unit 236 produces a terminal list display as shown in FIG. 17 (step #315) and decides existence of input by the mouse 28 (step #316) and, when not exist, decides existences of a trouble list at step #317 and, when the trouble list exists, performs the blink display indicating in trouble as shown in FIG. 19 (step #318), and the processing returns to the step #316. When the trouble list does not exist, the step also returns to #316. Detecting processing of the input and trouble list at steps #316–#318 mentioned above is hereinafter called A processing.

When there is an input at step #316, the unit 236 decides return or no return and, when return, processing returns to the step #301 and, when no return, decides up/down scroll or no up/down scroll (step #320) and, when the up/down scroll is selected, performs the up/down scroll processing at step #314 and processing returns to the step #316. Then the unit 236 checks whether or not a user display is selected by moving the cursor to the user display by the mouse 28 at step #321 and, when the user display, displays its contents in windows as shown in FIG. 20 and then erases the window display by the mouse 28 click (step #323, step #328) and processing returns to the step #316. Similarly when a machine type display is executed (step #324) the unit 236 performs the window display of its contents (step #325) and erases the windows by the next click (step #323, step #328) and processing returns to the step #316. Further, when a terminal display is performed (step #326), the unit 236 displays selected windows (step #327) and executes the A processing and then decides left/right scroll or not left/right scroll and, when the left/right scroll, erases windows (step #331) and moves the cursor to the corresponding terminal (step #332) and processing returns to the step #316. When not left/right scroll, the processing returns to the step #329. Display processing of users, machine types and terminals at steps #321–#332 is hereinafter called B processing.

Then the unit 236 decides selection of condition monitor (step #333) and, when not selected, processing returns to the step #316 and, when selected, displays a condition monitor screen as shown in FIG. 21 or FIG. 33 (step #334).

Then the unit 236 performs the A processing and B processing at each step #335 and step #336 and after finishing the B processing, that is, display of users, machine types or terminals, processing returns to the step #335, and when the display is not selected in the B processing, the unit 236 decides whether the next terminal is selected or not at step #337 and, when the next terminal is selected, displays the next terminal at step #338 and processing returns to the step #335. When the next terminal is not selected, the unit 236 decides whether a just one-preceding terminal is selected or not at step #339 and, when selected, displays the one-preceding terminal at step #340 and processing returns to the step #335. When the one-preceding terminal is not selected, the unit 236 decides whether return is selected or not (step #341) and, when selected, processing returns to the step #315 of a terminal list display. When return is not selected, the unit 236 decides whether the menu is selected or not (step #342) and, when selected, performs a window display of a submenu screen as shown in FIG. 22 (step #343). When the menu is not selected, the processing returns to the step #335 of the A processing. When the submenu is window-displayed, the unit 236 detects input wait and a trouble list in the A processing at step #344 and, when the input is performed by the mouse 28 click, erases the window display (step #345) and decides at steps #346, #353, #354 and #355 that which submenu is selected and, when selection from the menu is not performed due to misoperation, processing returns to the step #343.

When a performance record is selected at step #346, the unit 236 displays a PPC performance record screen of FIG. 23 with reference to the PPC data file and executes the A processing at step #348 and the B processing at step #349. When window displays in the B processing are completed, the processing returns to the step #348 of the A processing. When the B processing is not selected, the unit 236 decides whether or not return, changes of display, time axis or object, or left/right scroll are selected at respective steps of steps #350, #351 and #356 and when any one of them is not selected, processing returns to the step #348. When return is selected at step #350, the processing returns to the step #344 and performs a condition monitor screen display and, when change is selected at step #351, the unit 236 displays changed screens such as variation graphs of the exposure voltages shown in FIG. 23 and FIG. 24 (step #352) and processing returns to the step #348. When a left/right cursor is selected at step #356, the unit 236 moves the date cursor left/right (step #357) and processing returns to the step #348.

When the trouble record is selected at step #353, the unit 236 displays a trouble record screen of FIG. 25 referring to the PPC trouble record files (step #358), and performs the A processing (step #359) and B processing (step #360) and erases window displays in the B processing and then processing returns to the step #359. When the B processing is not selected, the unit 236 decides selection of return or up/down scroll (step #361, step #362) and, when the up/down scroll is selected, performs the up/down scroll at step #363 and, when any one of them is not selected and when return is selected and when the up/down scroll is completed, the processing returns to the step #334.

Similarly when a replacement record is selected at step #354, the unit 236 displays its screen as shown in FIG. 26 and makes decisions up to selection of the up/down scroll (step #364 to step #368). When the up/down scroll is not selected, the unit 236 decides selection of the replacement parts name (step #370) and displays parts names by windows (step #371) and performs the A processing and receives corresponding parts names (step #372) and displays them (step #373) and, when decision at the step #370 is NO and when the steps #373 or #369 finishes, the processing returns to the step #365.

When the number of copies is selected at step #355, the unit 236 displays a total number of copies shown in FIG. 27 at step #374 and decides each step from input A processing to left/right scroll selection (step #374–step #378), and decides selection of a change of a time axis and change of a size and, when the change of the time axis, window-displays a selected time axis (step

385) and performs the A processing at step #386 and displays a changed screen (step #387). When the change of the size, the unit 236 window-displays a selected size name as shown in FIG. 28 (step #382) and performs the A processing at step #386 and displays a changed screen (step #384).

When the announcement of replacement time is selected at step #309, the unit 236 arranges terminal numbers in order of high usage ratio on the basis of the usage ratio list (step #388) and displays a replacement time announcement screen shown in FIG. 30. Then the unit 236 performs the A processing (step #390) and decides which of return, up/down scroll, condition monitor and prediction is selected and, when return is selected at step #391 to #396, processing to the step #301 of the menu screen and, when the up/down scroll is selected, performs the up/down scroll (step #394) and processing returns to the step #390. When the condition monitor, the processing returns to the step #334 and, when the prediction, performs the window-displays of prediction periods shown in FIG. 31 (step #397) and the A processing (step #398) and calculates prediction values on the basis of the practical data (step #399) and displays the prediction data (step #400).

When the above selection is not made or the step #400 is completed, the processing returns to #390.

When the copy charge management is selected at step #310, the unit 236 loads data of monthly number of copies from the PPC data file at step #401 and displays a list of copying charge by a copying machine shown in FIG. 34 (step #402) and after the A processing, that is, input processing (step #403), decides which of the left/right scroll, change of displaying month, settlement, printing, B processing and return is selected at steps #404, #406, #409, #413, #415 and #416.

When the left/right scroll is selected, the unit 236 executes it (step #405) and processing returns to the step #403. When the change of displaying month is selected, the unit 236 window-displays monthly data arranged from January to December and, when the displaying month is selected (step #407), displays the charge data of a corresponding month (step #408) and processing returns to the step #403. When the settlement is selected, the unit 236 window-displays a settlement month and its term, thereby designates a settlement day (step #410) and calculates charges of the designated period (step #411) and saves it in the PPC charge data file (step #412) and processing returns to the step #403. When the printing is selected, the printing processing is performed by the printer 26 (step #414) and the processing returns to the step #403. When the window display of the B processing is finished at step #415, and also when the return is not selected at step #416, the processing returns to the step #403. Further, when the return is selected, the processing returns to the step #301 of the menu screen display.

When the user registration or machine type registration is selected at step #311 or step #312, the unit 236 loads data from the PPC user information file or PPC machine type information file (step #417) and displays them in lists as shown in FIGS. 36 and 37 (step #418), and after performing the A processing (step #419), decides which of cursor key, change, deletion, appendix, B processing and return is selected at steps #420, #422, #424, #428, #430 and #431 and, when the cursor key is selected, performs the up/down scroll (step #421) and, when the change is selected, inputs change data (step #423). When deletion is selected, the unit 236 decides whether terminal registration has been already performed or not (step #425) and, when not registered, window-displays the fact of an error (step #426) and, when registered, performs deletion processing (step #427). When appendix is selected, the unit 236 inputs the appendix data (step #429) and, when the B processing is selected and when the above processing is finished, processing returns to the step #419. When return is selected, the unit 236 loads the PPC user information file or PPC machine type information file with data (step #432) and processing returns to the step the step #301 of the menu screen, and, when not selected, returns the step to #419.

Last, when the terminal registration is selected at step #313, nearly the same operation as that performed at the above step #417–step #432 are executed at the step #433–step #447. That is, the unit 236 displays a list of copying machines undergone the term'al registration, as shown in FIG. 38, on the basis of PPC terminal information file data at step #434 and saves the data processed at step #447 in the PPC terminal information file. But the facts that the unit 236 does not decide terminal registration in the case of deletion and sorts data in order of a terminal number at step #446 before saving the data in the PPC terminal information file are different from the above steps already mentioned.

Figure 10:
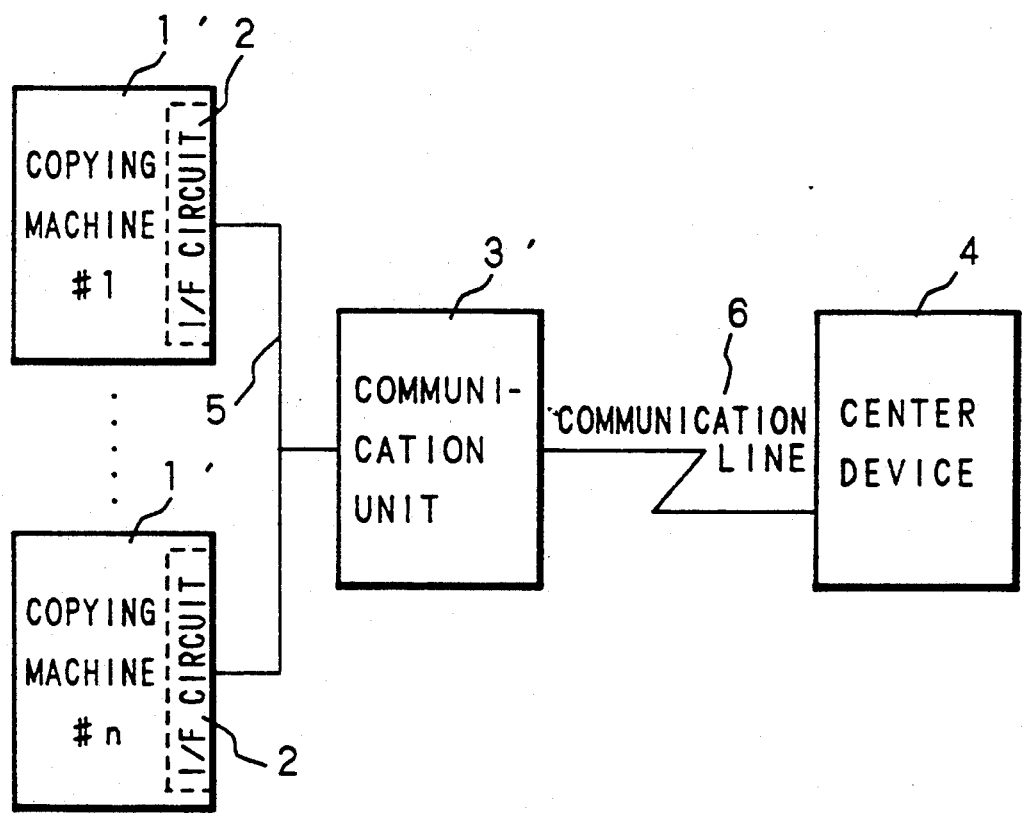
FIG. 10 is a schematic block diagram showing a modified configuration of the system.

Now, a modified example of this embodiment will be explained. FIG. 10 is a block diagram showing a configuration of the modified example. FIG. 11 is an example of an electronic message composition of data transmitted from the communication unit to the center device. In this example, one communication unit 3' is connected with a plurality of the copying machines 1', 1'.... Thus, as shown in FIG. 11, the electronic message transmitted from the communication unit 3' to the center device 4 is provided with a four digits terminal number (code) and following it is provided with terminal data. Other circuit configurations and operations are the same as the above embodiment, therefore, the explanation is omitted.

Then another embodiment of the invention will be explained. The aforementioned embodiment uses the copying machine as a terminal device, and this embodiment employs an automatic vending machine as a terminal device. In addition, when the copying machine 1 or 1' is replaced by the automatic vending machine, the same configuration as FIG. 1 or FIG. 10 is obtained, thus the explanation is omitted.

As an example, explaining an automatics vending machine vending beverages such as juice, coffee or the like with paper cups, it issues trouble information including using-up of source materials such as coffee powder, juice material, using-up of materials such as cups, carbon dioxide gas, drainage-buckets full of leftover beverages, trouble of coin mechanism, and supply information including a usage ratio of source material such as juice, coffee. FIGS. 39–42 are display examples of the data display unit of another embodiment.

Figure 39:
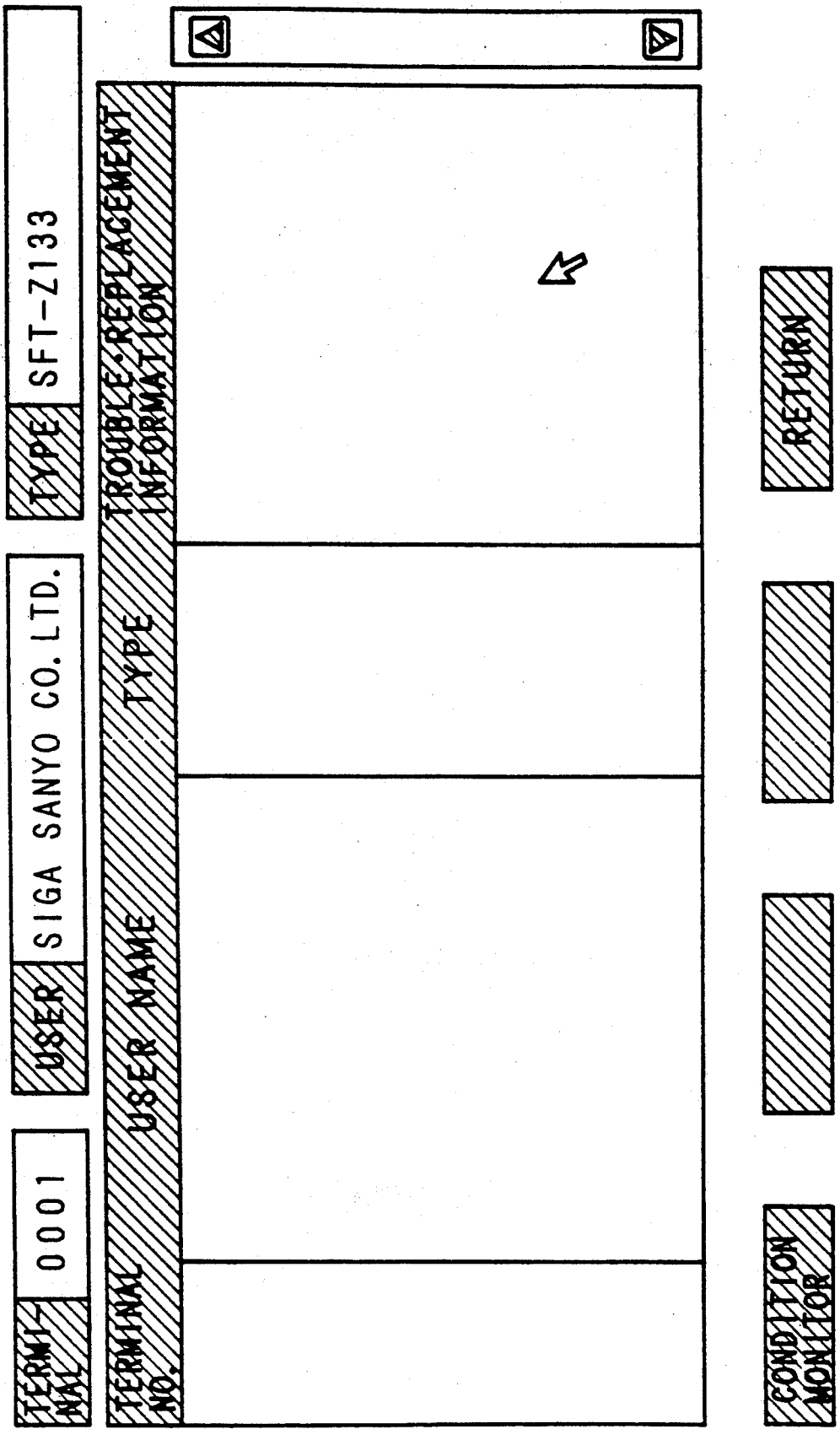

FIG. 39 is a diagram corresponding to FIG. 17 of the first embodiment and shows a screen when an automatic vending machine is selected from the menu screens. This screen displays terminal numbers of automatic vending machines, user names and machine type names and the automatic vending machines to be objects of processing are selected by the mouse 28. At this time a troubled automatic vending machine indicated by trouble information and a supply requesting automatic vending machine indicated by supply information display these aspects in a trouble and replacement information column.

Figure 40:
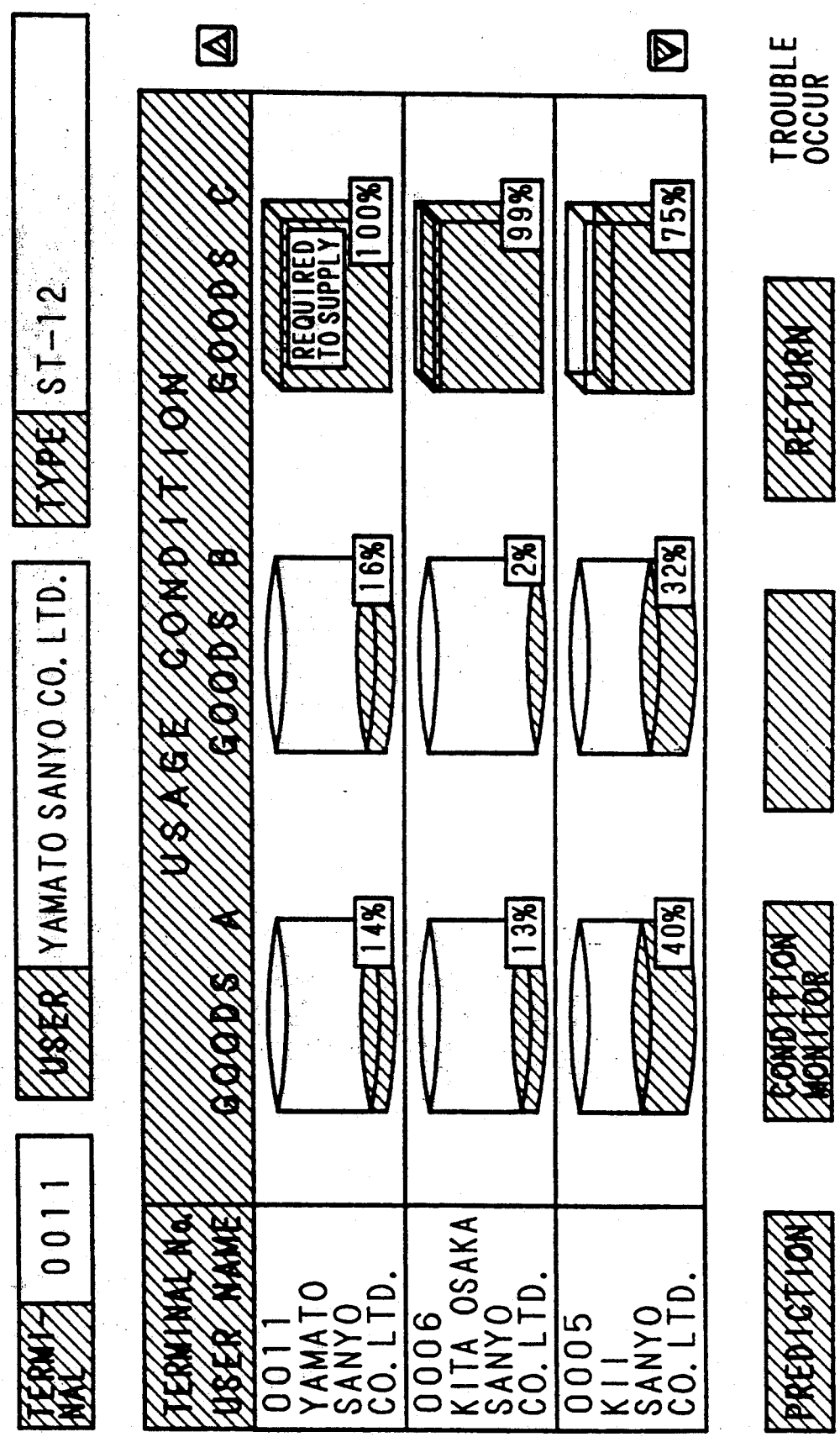
Figure 41:
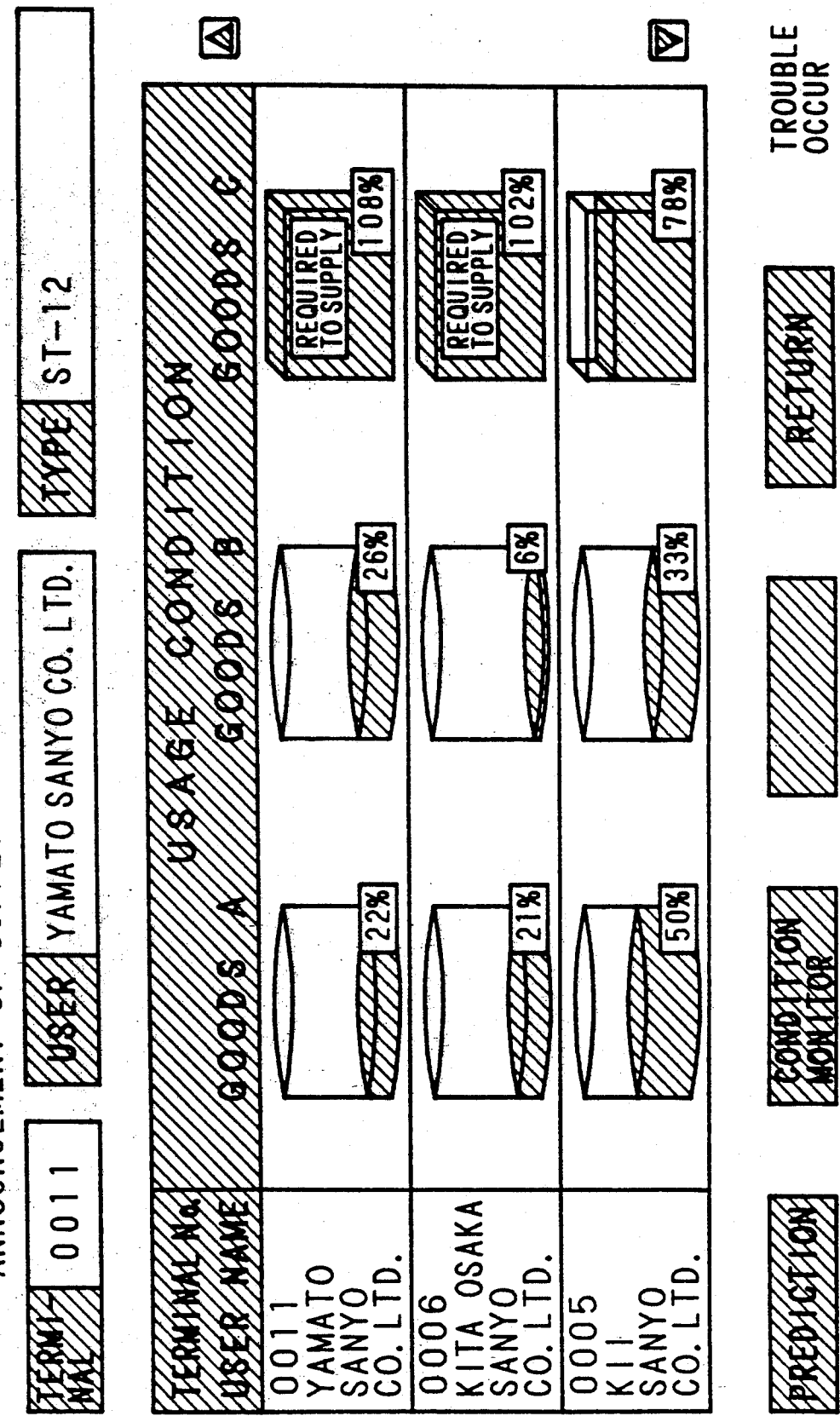

FIG. 40 corresponds to FIG. 30 and is a diagram showing a display screen for announcement of supplying time and this screen is displayed by selecting the announcement of supplying time from the menu screens. In this display, the automatic vending machines are arranged in order of high usage ratio of materials such as supplies of juice raw material and coffee powder. In this display when selecting prediction, an operator can obtain a prediction of the usage ratio in one week or one month future and also a prediction of a day of next supply on the basis of calculation of the usage ratio and quantity up to now as shown in FIG. 41.

FIG. 42 is a diagram showing a display screen for an automatic vending machine trouble record, and corresponds to FIG. 25. In this display, dates of occurred troubles and their contents are displayed every automatic vending machine.

In the above embodiments, the system connected with a copying machines or automatic vending machines as terminal devices is explained respectively, but it is needless to say that this invention is not limited to these embodiment but can be applied to all machines which require field service.

Further, in the above embodiments the center device performs calculation and storage of the usage quantity of the consumable goods, however, it is needless to say that the usage quantity may be detected by an interface circuit of each terminal device.

As mentioned above in detail, in the present invention, when the system receives abnormality information such as paper choke-up or abnormal exposure from a terminal device, information concerning the abnormality is displayed on a part or full of a display screen even when any other processing is proceeding, thus the abnormality occurrence is immediately announced and the notice can be performed in low cost without being limited to a number of the terminal devices.

In the present invention, when the system receives abnormality information such as paper choke-up, abnormal exposure or using-up from the terminal devices, this information is stored with time and a record of the abnormality information is prepared and can be displayed at any necessary timing, thus when abnormality occurs, the abnormality record can be instantly retrieved, therefore maintenance information such as necessity of replacement parts or goods can be immediately obtained. In addition in the automatic vending machine, when abnormality information such as selling-out is frequently issued from specific goods, sales information like a trend of well-sold goods is accurately obtained.

In the present invention, when the system receives functional data such as exposure voltages, development bias voltages, the image forming unit stores this data and displays a plurality of data in lists at any necessary timing, thereby instantly announcing correlation between data and when abnormality occurs and a serviceman searches its cause, he can obtain accurate maintenance information. For example, when the serviceman receives a claim that images are thin, he displays exposure voltages and development bias voltages in a list to refer to them and can instantly decide which side is abnormal, thereby accurately searching the cause of the abnormality and quickly coping with it.

Further in the present invention, when the system receives functional data such as exposure voltages, development bias voltages, the image forming unit stores this data with date and time and the record of the data is prepared and can be displayed at any necessary time, thus a change in data is clarified and the abnormality can be predicted, as a result prevention of it becomes possible. Thus the serviceman or operator can clarify a change in a function of the terminal device with the record of its functional data at the time of abnormality occurrence and search accurately the cause of the abnormality and decide necessity of the replacement parts.

Further, in the present invention, the usage ratio of the consumable goods such as the photosensitive drums, developer and the like is obtained from data of a number of copies, thus the terminal devices are displayed in order of a large usage quantity (ratio) and the image forming unit can inform the serviceman or operator of parts replacement or material supply in order of the terminal device having the high necessity, and he can obtain a prediction of usage quantity of the consumable goods over a future predetermined term and thus recognize a time of replacement or supply, therefore possibility of using up of parts or goods is eliminated. In addition, after the replacement or supply, usage information is initialized, thus reliability of the usage information is improved, and the system of the invention performs superior effects as mentioned above.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

What is claimed is:

1. A centralized control system for a plurality of terminal devices comprising:

information collection means provided in each of said terminal devices for collecting information of device status including at least one of functional information concerning the function of each terminal device and information showing abnormality of each terminal device and its contents;

terminal communication means connected to each information collecting means for monitoring collected functional and abnormality information and transmitting it as the need arises; and remote control means for receiving said information from said each terminal communication means, selectively displaying the received information on a display unit and performing control processing at each terminal device, said remote control means including display control means for displaying information relative to said abnormality information of a terminal device on a part or all of a plurality of display screens of said display unit which displays the control processing immediately when said abnormality information is received irrespective of the type of control processing being carried out for the terminal device for which the abnormality is displayed.

2. A centralized control system for terminal devices as set forth in claim 1, wherein a said terminal communication means previously determines an order of priority of transmittances according to contents of the abnormality of said abnormality information and said abnormality information to said remote control means in the determined order of priority.

3. A centralized control system for terminal devices as set forth in claim 2, wherein, when said abnormality information having the highest order of priority is collected by said information collecting means, said terminal communication means transmits the collected abnormality information to said remote control means whenever said abnormality information is collected.

4. A centralized control system for terminal devices as set forth in claim 2, wherein said terminal communication means determines a plurality of transmittance time zones according to the determined order of priority, and transmits said abnormality information in a determined time zone.

5. A centralized control system for terminal devices as set forth in claim 1, wherein said information collecting means collects a plurality of informations from an automatic vending machine as a terminal device.

6. A centralized control system for a plurality of terminal devices comprising:
information collecting means provided in each of said terminal devices for collecting information on device status including at least one of functional information concerning the function of each terminal device and information showing abnormality of each terminal device and its contents;
terminal communication means connected to each information collecting means for monitoring collected information and transmitting it as the need arises; and
remote control means for receiving said information from said each terminal communication means, selectively displaying the received information on a display unit and performing a plurality of control processing at each terminal device, said remote control means including storage means for storing the contents of the abnormality of said abnormality information and information relative to the time of reception of said abnormality information for each terminal device, and display control means for displaying from said storage means the stored contents relative to said abnormality information in the time order received from every terminal device on said display unit.

7. A centralized control system for terminal devices as set forth in claim 6, wherein said information collecting means collects a plurality of informations from a copying machine as a terminal device.

8. A centralized control system for terminal devices as set forth in claim 7, wherein said abnormality information collected by said information collecting means includes paper jam, using-up of developer, using-up of paper sheets, abnormal voltages of each part, and abnormal fixing at each copying machine.

9. A centralized control system for terminal devices as set forth in claim 7, wherein said functional information collected by said information collecting means includes a number of copies of each paper size, exposure voltages, development bias voltages, and heat roll temperatures.

10. A centralized control system for a plurality of terminal devices comprising:
information collecting means provided in each of said terminal devices for collecting information on device status including functional information concerning a plurality of the functions of each terminal device and information showing abnormality of the terminal device and its contents;
terminal communication means connected to said information collecting means for monitoring collected information and transmitting it as the need arises;
remote control means for receiving said information from said each terminal communication means, selectively displaying the received information on a display unit and performing a plurality of control processings at each terminal device, said remote control means further comprising means for storing information relative to the plurality of functions at each terminal device and display control means for simultaneously displaying on the display unit the stored functional information relating to the plurality of functions of a terminal device.

11. A centralized control system for terminal devices as set forth in claim 10 wherein said functional information stored in said storage means includes at least one of exposure voltage, development bias voltage and heating roller temperature.

12. A centralized control system for a plurality of terminal devices comprising:
information collecting means provided in each of said terminal devices for collecting information on device status including at least one of functional information concerning at least one of the functions of each terminal device and information showing abnormality of the device and its contents;
terminal communication means connected to said information collecting means for monitoring collected information and transmitting it as the need arises; and
remote control means for receiving said information from said each terminal communication means, selectively displaying the received information on a display unit and performing a plurality of control processings at each terminal device;
said remote control means further comprising means for storing said functional information and information relative to the time of its reception from each terminal device and display control means for displaying on said display unit all of the stored information relative to said at least one function of a terminal device including the time of its reception.

13. A centralized control system for a plurality of terminal devices comprising:
information collecting means provided in each of said terminal devices for collecting information on device status including at least one of functional information concerning the function of each terminal device and information showing abnormality of the device and its contents;
terminal communication means connected to said information collecting means for monitoring collected information and transmitting it as the need arises; and
remote control means for receiving said of information from said each terminal communication means, selectively displaying the received information on a display unit and performing a plurality of control processings at each terminal device;
said remote control means further comprising means for calculating usage quantity information concerning quantity of consumable goods used in each terminal device on the basis of said functional information, storage means for storing the calculated usage quantity information and displaying on said display unit the calculated usage quantity information in the order of higher to lower usage ratio.

14. A centralized control system for terminal devices as set forth in claim 13, wherein said remote control means further comprises initializing means for initializing contents of stored usage quantity information when said consumable goods is (are) replaced or supplied on the basis of the calculated usage quantity information of each terminal device.

15. A centralized control system for terminal devices as set forth in claim 13, wherein said remote control means further comprises means for predicting a timing for necessary replacement or supply of said consumable goods on the basis of the calculated usage quantity information.

16. A centralized control system for terminal devices as set forth in claim 13, wherein said display control means displays the stored usage quantity information in an order relative to its usage quantity on said display unit.

17. A centralized control system for terminal devices as set forth in claim 13, wherein said display control means displays a plurality of said functional informations and a plurality of said usage quantity informations in lists on said display unit.

* * * * *